(12) United States Patent  
Miyake

(10) Patent No.: US 9,172,946 B2  
(45) Date of Patent: Oct. 27, 2015

(54) METHOD FOR DRIVING LIQUID CRYSTAL DISPLAY DEVICE DISPLAYING STEREOSCOPIC IMAGES

(75) Inventor: Hiroyuki Miyake, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 405 days.

(21) Appl. No.: 13/184,594

(22) Filed: Jul. 18, 2011

(65) Prior Publication Data

US 2012/0062614 A1 Mar. 15, 2012

(30) Foreign Application Priority Data

Jul. 27, 2010 (JP) ................................. 2010-167824

(51) Int. Cl.  
*G09G 3/36* (2006.01)  
*H04N 13/04* (2006.01)  
(Continued)

(52) U.S. Cl.  
CPC ........... *H04N 13/0438* (2013.01); *G09G 3/003* (2013.01); *G09G 3/3648* (2013.01); *H04N 13/0497* (2013.01); *G09G 3/342* (2013.01); *G09G 3/3413* (2013.01); *G09G 3/3677* (2013.01); *G09G 3/3688* (2013.01); *G09G 2310/024* (2013.01); *G09G 2310/0218* (2013.01); *G09G 2310/0235* (2013.01); *G09G 2310/0286* (2013.01); *G09G 2310/0291* (2013.01); *G09G 2310/08* (2013.01); *G09G 2320/0242* (2013.01); *G09G 2380/14* (2013.01); *G09G 2380/16* (2013.01)

(58) Field of Classification Search  
CPC ................... G09G 3/22–3/28; G09G 2310/0235–2310/0237; G09G 2320/045; G09G 2360/141

USPC ................................................... 345/87–104  
See application file for complete search history.

(56) References Cited

U.S. PATENT DOCUMENTS 5,537,476 A 7/1996 Coteus et al.  
6,283,597 B1 9/2001 Jorke  
(Continued)

FOREIGN PATENT DOCUMENTS

JP 01-116521 A 5/1989  
JP 11-337904 A 12/1999  
(Continued)

OTHER PUBLICATIONS

Written Opinion (Application No. PCT/JP2011/066026) Dated Oct. 18, 2011.  
(Continued)

*Primary Examiner* — Sanghyuk Park  
(74) *Attorney, Agent, or Firm* — Eric J. Robinson; Robinson Intellectual Property Law Office, P.C.

(57) ABSTRACT

The image quality of a liquid crystal display device that can display stereoscopic images is improved without the decrease in resolution. In a method for driving a liquid crystal display device that displays stereoscopic images by a wavelength division method, a first image seen with left eye and a second image seen with right eye are displayed using R, G, and B whose wavelength bands are different from each other by a field-sequential method. In the field-sequential method, writing of video signals and lighting of a backlight are sequentially performed not in the entire pixel portion but in each given region of the pixel portion.

10 Claims, 13 Drawing Sheets

(51) Int. Cl.
G09G 3/00 (2006.01)
G09G 3/34 (2006.01)

(56) References Cited

U.S. PATENT DOCUMENTS

| | | |
|---|---|---|
| 6,448,951 B1 | 9/2002 | Sakaguchi et al. |
| 6,597,348 B1 | 7/2003 | Yamazaki et al. |
| 6,698,890 B1 | 3/2004 | Jorke |
| 6,882,012 B2 | 4/2005 | Yamazaki et al. |
| 7,001,021 B2 | 2/2006 | Jorke |
| 7,193,593 B2 | 3/2007 | Koyama et al. |
| 7,224,339 B2 | 5/2007 | Koyama et al. |
| 7,268,756 B2 | 9/2007 | Koyama et al. |
| 7,317,438 B2 | 1/2008 | Yamazaki et al. |
| 7,385,579 B2 | 6/2008 | Satake |
| 7,403,177 B2 | 7/2008 | Tanada et al. |
| 7,425,937 B2 | 9/2008 | Inukai |
| 7,773,066 B2 | 8/2010 | Yamazaki et al. |
| 7,791,571 B2 | 9/2010 | Ohtani et al. |
| 7,834,830 B2 | 11/2010 | Yamazaki et al. |
| 7,855,770 B2 | 12/2010 | Egi et al. |
| 2003/0063062 A1* | 4/2003 | Tsumura et al. ............... 345/102 |
| 2007/0188711 A1 | 8/2007 | Sharp et al. |
| 2007/0279352 A1* | 12/2007 | Tanaka ............... 345/87 |
| 2007/0279374 A1 | 12/2007 | Kimura et al. |
| 2008/0239180 A1* | 10/2008 | Sekine ............... 349/37 |
| 2010/0066813 A1 | 3/2010 | Jorke |
| 2010/0149635 A1 | 6/2010 | Simon et al. |
| 2010/0188439 A1* | 7/2010 | Sugimoto et al. ............... 345/690 |
| 2010/0321420 A1 | 12/2010 | Ohtani et al. |
| 2011/0001725 A1 | 1/2011 | Kurokawa |
| 2011/0025729 A1 | 2/2011 | Yamazaki et al. |
| 2011/0051034 A1 | 3/2011 | Egi et al. |
| 2011/0292088 A1 | 12/2011 | Toyotaka et al. |
| 2011/0310133 A1 | 12/2011 | Koyama et al. |

FOREIGN PATENT DOCUMENTS

| | | |
|---|---|---|
| JP | 2000-275605 A | 10/2000 |
| JP | 2001-142140 A | 5/2001 |
| JP | 2003-501680 | 1/2003 |
| JP | 2003-264853 A | 9/2003 |
| JP | 2006-220685 A | 8/2006 |
| JP | 2007-264211 A | 10/2007 |
| JP | 2007-328309 A | 12/2007 |
| JP | 2009-042405 A | 2/2009 |
| JP | 2009-526277 | 7/2009 |
| JP | 2009-186533 A | 8/2009 |
| JP | 2009-229645 | 10/2009 |
| JP | 2009-229645 A | 10/2009 |
| JP | 2010-510532 | 4/2010 |
| JP | 2010-537254 | 12/2010 |
| WO | WO-2007/095476 | 8/2007 |

OTHER PUBLICATIONS

Simon.A et al., "58.3: Recent Progress in Interference-filter-based Stereoscopic 3D LCD", SID Digest '10 : SID International Symposium Digest of Technical Papers, 2010, vol. 41, No. 1, pp. 867-869.

International Search Report (Application No. PCT/JP2011/066026) Dated Oct. 18, 2011.

Baron.P et al., "36.4: Can Motion Compensation Eliminate Color Breakup of Moving Objects in Field-Sequential Color Displays?," SID Digest '96: SID International Symposium Digest of Technical Papers, 1996, vol. 27, pp. 843-846.

Kurita.T et al., "Evaluation and Improvement of Picture Quality for Moving Images on Field-sequential Color Displays," IDW '00: Proceedings of the 17th International Display Workshops, 2000, pp. 69-72.

Taira.K et al., "A15 Field-Sequential Display without Color Break-Up using an AFLC Color Shutter," IDW '00 : Proceedings of the 17th International Display Workshops, 2000, pp. 73-76.

Jarvenpaa.T, "7.2: Measuring Color Breakup of Stationary Images in Field-Sequential-Color Displays," SID Digest '04: SID International Symposium Digest of Technical Papers, 2004, vol. 35, pp. 82-85.

* cited by examiner

US 9,172,946 B2

METHOD FOR DRIVING LIQUID CRYSTAL DISPLAY DEVICE DISPLAYING STEREOSCOPIC IMAGES

TECHNICAL FIELD

The present invention relates to methods for driving liquid crystal display devices. In particular, the present invention relates to methods for driving liquid crystal display devices that display stereoscopic (three-dimensional) images by a field-sequential method.

BACKGROUND ART

Liquid crystal display devices are widely used in large display devices such as television receivers to small display devices such as cellular phones. High-value-added products will be needed and are being developed. In recent years, liquid crystal display devices that can display stereoscopic images have been developed in order to display more realistic images.

As a method for displaying stereoscopic images, a method by which an image seen with left eye and an image seen with right eye are separated and visually identified using eyeglasses (such a method is also referred to as an image separation method) is suitable for viewing images on large screens because the viewing angle can be wide. The image separation method is a method in which an image for left eye and an image for right eye are prepared, and an image seen with left eye of a viewer and an image seen with right eye of the viewer are separated using eyeglasses that include a liquid-crystal shutter, a polarization filter, or a spectral filter.

Note that temporal separation of right and left images with a liquid-crystal shutter is also referred to as a frame-sequential method. Wavelength separation of right and left images with a spectral filter is also referred to as a wavelength division (selection) method.

As a display device that displays stereoscopic images by a wavelength division method, for example, there is a display device disclosed in Reference 1.

REFERENCE

Reference 1: Japanese Published Patent Application No. 2009-229645

DISCLOSURE OF INVENTION

Here, a wavelength-division liquid crystal display device is described with reference to FIGS. 13A to 13D. FIG. 13A is an external view of a liquid crystal display device 801 and eyeglasses 802 with spectral filters. The eyeglasses 802 include a spectral filter 803A for left eye and a spectral filter 803B for right eye.

FIG. 13B is a simple graph in which the horizontal axis shows wavelengths in a visible light range and the vertical axis shows intensity. A visible light range 810 has a red wavelength band 811, a green wavelength band 812, and a blue wavelength band 813. In the red wavelength band 811, a first red wavelength band R1 is provided on a short wavelength side, and a second red wavelength band R2 is provided on a long wavelength side. In the green wavelength band 812, a first green wavelength band G1 is provided on a short wavelength side, and a second green wavelength band G2 is provided on a long wavelength side. In the blue wavelength band 813, a first blue wavelength band B1 is provided on a short wavelength side, and a second blue wavelength band B2 is provided on a long wavelength side.

Next, how a viewer sees an image by a wavelength division method is described. Here, description is made with reference to a schematic view in FIG. 13C.

The spectral filter 803A for the left eye in FIG. 13A transmits light in the first red wavelength band R1, light in the first green wavelength band G1, and light in the first blue wavelength band B1 (as indicated by a solid arrow in FIG. 13C), and does not transmit light in the second red wavelength band R2, light in the second green wavelength band G2, and light in the second blue wavelength band B2 (as indicated by a dotted arrow in FIG. 13C). As an image 821 for the left eye, a video signal is converted in advance so that a color image is displayed in the first red wavelength band R1, the first green wavelength band G1, and the first blue wavelength band B1. Then, left eye 823 of the viewer can visually identify the image for the left eye selectively.

Similarly, the spectral filter 803B for the right eye transmits light in the second red wavelength band R2, light in the second green wavelength band G2, and light in the second blue wavelength band B2 (as indicated by a solid arrow in FIG. 13C), and does not transmit light in the first red wavelength band R1, light in the first green wavelength band G1, and light in the first blue wavelength band B1 (as indicated by a dotted arrow in FIG. 13C). As an image 822 for the right eye, a video signal is converted in advance so that a color image is displayed in the second red wavelength band R2, the second green wavelength band G2, and the second blue wavelength band B2. Then, right eye 824 of the viewer can visually identify the image for the right eye selectively.

By the wavelength division method, the viewer can simulate parallax at the time when a stereoscopic object is visually identified with the left eye 823 and the right eye 824; thus, a stereoscopic image can be displayed.

Note that the image 821 for the left eye and the image 822 for the right eye illustrated in FIG. 13C can be concurrently displayed on one display screen. For example, as illustrated in FIG. 13D, the image 821 for the left eye and the image 822 for the right eye may be concurrently displayed on one display screen by a projector 831 of the image 821 for the left eye and a projector for the image 822 for the right eye.

In stereoscopic display by the wavelength division method illustrated in FIGS. 13A to 13D, in the case where ppi (pixel per inch) is increased by the increase in the number of pixels without a change in display area, display by a field-sequential method in which pixels do not need subpixels can be used. A field-sequential liquid crystal display device includes a plurality of light sources that emit light of different colors (e.g., red (R), green (G), and blue (B)). A desired color is expressed by sequential lighting of the plurality of light sources and control of transmission of light of different colors in each pixel.

In a field-sequential liquid crystal display device, it is necessary to increase the frequency of input of video signals based on a plurality of light sources. Note that in the example of FIGS. 13A to 13D, the plurality of light sources are a light source in the first red wavelength band R1, a light source in the first green wavelength band G1, a light source in the first blue wavelength band B1, a light source in the second red wavelength band R2, a light source in the second green wavelength band G2, and a light source in the second blue wavelength band B2.

In order to increase the frequency of input of video signals, it is important to increase the response speed of elements provided in pixels. In order to increase the response speed of the elements provided in the pixels, for example, it is necessary to increase the mobility of transistors provided in the pixels. However, as a display portion becomes larger, the increase in mobility of the transistors becomes more difficult. On the other hand, the increase in frequency of input of video signals reduces display defects caused by color breakup that is a display problem unique to a field-sequential method. Thus, it is important to shorten a writing period of video signals.

It is therefore an object of one embodiment of the present invention to provide a liquid crystal display device in which the frequency of input of video signals is increased and stereoscopic images can be displayed without the decrease in resolution.

One embodiment of the present invention is a method for driving a liquid crystal display device including a plurality of pixels arranged in m rows by n columns (m is a natural number of 12 or more and n is a natural number) in which a stereoscopic image is visually identified using an eyeglass including a spectral filter for left eye for visually identifying a first image by a field-sequential method by transmission of light in a first red wavelength band, light in a first green wavelength band, and light in a first blue wavelength band and a spectral filter for right eye for visually identifying a second image by a field-sequential method by transmission of light in a second red wavelength band, light in a second green wavelength band, and light in a second blue wavelength band. In the method, in a period during which a video signal used for controlling transmission of light of a first color is input to a plurality of pixels arranged in a first row to a k-th row (k is a natural number of less than or equal to (m/3)), a video signal used for controlling transmission of light of a second color is input to a plurality of pixels arranged in a (k+1)th row to a 2k-th row, and a video signal used for controlling transmission of light of a third color is input to a plurality of pixels arranged in a (2k+1)th row to an m-th row, the video signal used for controlling transmission of the light of the first color is input to a plurality of pixels arranged in the first row to a t-th row (t is a natural number of (k/N) (N is a natural number)), the video signal used for controlling transmission of the light of the second color is input to a plurality of pixels arranged in the (k+1)th row to a (k+t)th row, and the video signal used for controlling transmission of the light of the third color is input to a plurality of pixels arranged in the (2k+1)th row to a (2k+t)th row. Then, the plurality of pixels arranged in the first row to the t-th row are irradiated with the light of the first color; the plurality of pixels arranged in the (k+1)th row to the (k+t)th row are irradiated with the light of the second color; and the plurality of pixels arranged in the (2k+1)th row to the (2k+t)th row are irradiated with the light of the third color. Irradiation is performed so that the light of the first color, the light of the second color, and the light of the third color correspond to light in the first red wavelength band, light in the first green wavelength band, and light in the first blue wavelength band in given combinations. After that, irradiation is performed so that the light of the first color, the light of the second color, and the light of the third color correspond to light in the second red wavelength band, light in the second green wavelength band, and light in the second blue wavelength band in given combinations. In the driving method, under the conditions of natural numbers of n=1 to n=((k/t)−1), operations of irradiation with the light of the first color, irradiation with the light of the second color, and irradiation with the light of the third color after video signals are input to (1+nt)th to ((n+1)t)th rows, (k+(1+nt))th to (k+(n+1)t)th rows, (2k+(1+nt))th to (2k+(n+1)t)th rows are sequentially performed. In the driving method, the light of the first color, the light of the second color, and the light of the third color correspond to the light in the first red wavelength band, the light in the first green wavelength band, and the light in the first blue wavelength band in given combinations. As a specific example, the light of the first color corresponds to the light in the first blue wavelength band; the light of the second color corresponds to the light in the first green wavelength band; and the light of the third color corresponds to the light in the first red wavelength band. As a similar specific example, the light of the first color corresponds to the light in the second blue wavelength band; the light of the second color corresponds to the light in the second green wavelength band; and the light of the third color corresponds to the light in the second red wavelength band.

In one embodiment of the present invention, it is preferable to employ a method for driving a liquid crystal display device in which an image seen through the spectral filter for the left eye is visually identified sequentially from the first image and a black image and an image seen through the spectral filter for the right eye is visually identified sequentially from a black image and the second image.

In one embodiment of the present invention, it is preferable to employ a method for driving a liquid crystal display device in which irradiation with the light in the first red wavelength band, irradiation with the light in the first green wavelength band, irradiation with the light in the first blue wavelength band, irradiation with the light in the second red wavelength band, irradiation with the light in the second green wavelength band, and irradiation with the light in the second blue wavelength band are separately performed.

In a liquid crystal display device in one embodiment of the present invention, input of video signals and lighting of a backlight are sequentially performed not in the entire pixel portion but in each given region of the pixel portion. Thus, the frequency of input of video signals to pixels in the liquid crystal display device can be increased. Accordingly, it is possible to provide a liquid crystal display device in which display degradation such as color breakup is suppressed and stereoscopic images can be displayed without the decrease in resolution.

BEST MODE FOR CARRYING OUT THE INVENTION

Figure 1A:
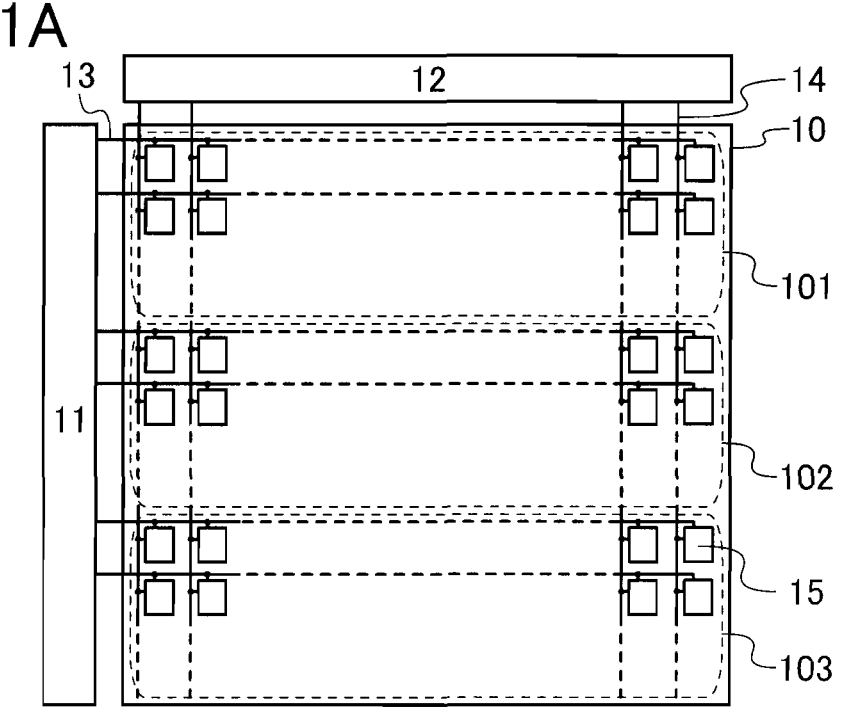
FIGS. 1A and 1B illustrate a structure example of a liquid crystal display device.

Embodiments of the present invention will be described below with reference to the drawings. Note that the embodiments can be implemented in various different ways. It will be readily appreciated by those skilled in the art that modes and details of the embodiments can be modified in various ways without departing from the spirit and scope of the present invention. The present invention therefore should not be construed as being limited to the description of the embodiments. Note that in structures of the present invention described below, reference numerals denoting the same portions are used in common in different drawings.

Note that the size, the layer thickness, the signal waveform, or the region of each component illustrated in drawings and the like in embodiments is exaggerated for clarity in some cases. Thus, embodiments of the present invention are not limited to such scales.

Note that in this specification, terms such as "first", "second", "third", and "N-th" (N is a natural number) are used in order to avoid confusion among components and do not limit the number. The natural number is 1 or more unless otherwise specified.

Embodiment 1

In this embodiment, a liquid crystal display device in one embodiment of the present invention is described with reference to FIGS. 1A and 1B, FIGS. 2A to 2C, FIGS. 3A to 3D, FIGS. 4A and 4B, FIG. 5, FIG. 6, FIG. 7, FIG. 8, FIG. 9, and FIG. 10.

<Structure Example of Liquid Crystal Display Device>

FIG. 1A illustrates a structure example of a liquid crystal display device. The liquid crystal display device illustrated in FIG. 1A includes a pixel portion 10; a scan line driver circuit 11; a signal line driver circuit 12; m (m is a natural number of 12 or more) scan lines 13 which are arranged parallel or almost parallel to each other and whose potentials are controlled by the scan line driver circuit 11; and n (n is a natural number) signal lines 14 which are arranged parallel or almost parallel to each other and whose potentials are controlled by the signal line driver circuit 12. The pixel portion 10 is divided into three regions (regions 101 to 103), and each region includes a plurality of pixels arranged in matrix.

Note that each of the scan lines 13 is electrically connected to n pixels provided in a given row among the plurality of pixels arranged in m rows by n columns in the pixel portion 10. In addition, each of the signal lines 14 is electrically connected to m pixels provided in a given column among the plurality of pixels arranged in the m rows by the n columns.

Figure 1B:
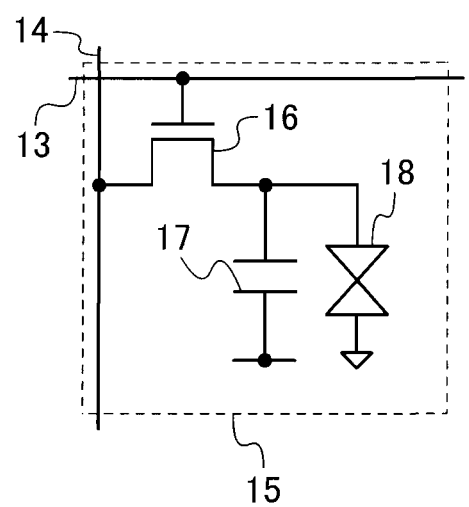

FIG. 1B is an example of a circuit diagram of a pixel 15 included in the liquid crystal display device illustrated in FIG. 1A. The pixel 15 illustrated in FIG. 1B includes a transistor 16, a capacitor 17, and a liquid crystal element 18. A gate of the transistor 16 is electrically connected to the scan line 13. One of a source and a drain of the transistor 16 is electrically connected to the signal line 14. One electrode of the capacitor 17 is electrically connected to the other of the source and the drain of the transistor 16. The other electrode of the capacitor 17 is electrically connected to a wiring (also referred to as a capacitor line) that supplies a capacitor potential. One electrode (also referred to as a pixel electrode) of the liquid crystal element 18 is electrically connected to the other of the source and the drain of the transistor 16 and the one electrode of the capacitor 17. The other electrode (also referred to as a counter electrode) of the liquid crystal element 18 is electrically connected to a wiring that supplies a counter potential.

Note that description is made on the transistor 16 as an-channel transistor. The capacitor potential and the counter potential can be the same potential.

<Structure Example of Scan Line Driver Circuit 11>

Figure 2A:
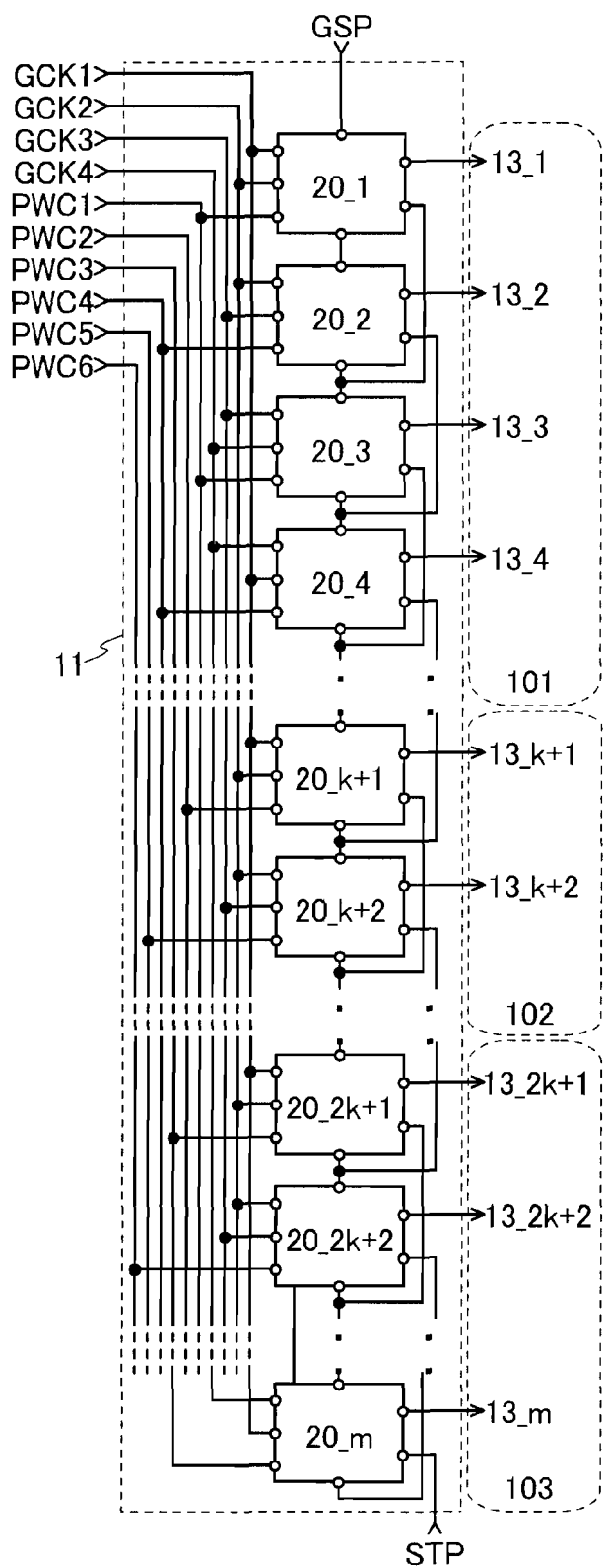
FIGS. 2A to 2C illustrate a structure example of a scan line driver circuit.

FIG. 2A illustrates a structure example of the scan line driver circuit 11 included in the liquid crystal display device illustrated in FIG. 1A. The scan line driver circuit 11 illustrated in FIG. 2A includes wirings that supply first to fourth scan line driver circuit clock signals GCK1 to GCK4, wirings that supply first to sixth pulse width control signals PWC1 to PWC6, and first to m-th pulse output circuits 20_1 to 20_$m$ that are connected to the scan lines 13 in the first to m-th rows.

Note that in this embodiment, the first to k-th pulse output circuits 20_1 to 20_$k$ (k is a natural number of less than or equal to (m/3)) are electrically connected to the scan lines 13 provided in the region 101. In this embodiment, k is preferably a multiple of the number of clock signals GCK1 to GCK4 supplied to the scan line driver circuit 11, i.e., a multiple of 4.

In addition, the (k+1)th to 2k-th pulse output circuits 20_(k+1) to 20_2k are electrically connected to the scan lines 13 provided in the region 102. Further, the (2k+1)th to m-th pulse output circuits 20_(2k+1) to 20_$m$ are electrically connected to the scan lines 13 provided in the region 103.

The first to m-th pulse output circuits 20_1 to 20_$m$ have a function of sequentially shifting a shift pulse in each shift period in response to a scan line driver circuit start pulse GSP which is input to the first pulse output circuit 20_1. Further, a plurality of shift pulses can be shifted in the first to m-th pulse output circuits 20_1 to 20_$m$ concurrently. In other words, even in a period during which a shift pulse is shifted in the first to m-th pulse output circuits 20_1 to 20_$m$, the scan line driver circuit start pulse GSP can be input to the first pulse output circuit 20_1.

Figure 2B:
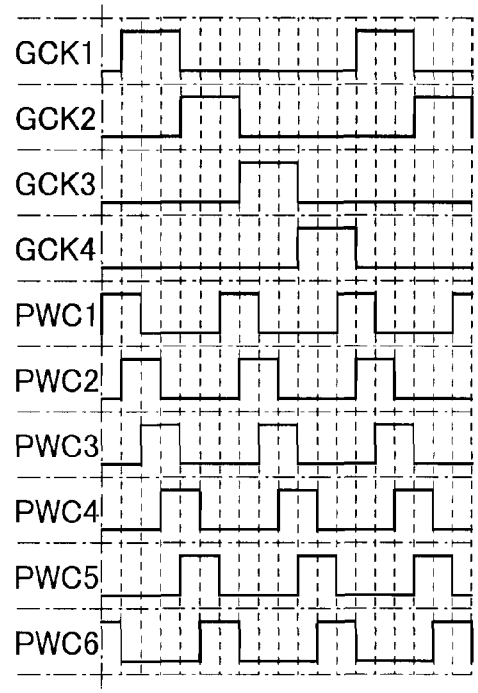

FIG. 2B illustrates examples of specific waveforms of the signals. The first scan line driver circuit clock signal GCK1 in FIG. 2B periodically repeats a high power supply potential Vdd (hereinafter referred to as a high-level potential) and a low power supply potential Vss (hereinafter referred to as a low-level potential) and has a duty ratio of 1/4. The phase of the second scan line driver circuit clock signal GCK2 is shifted from the first scan line driver circuit clock signal GCK1 by 1/4 period. The phase of the third scan line driver circuit clock signal GCK3 is shifted from the first scan line driver circuit clock signal GCK1 by 1/2 period. The phase of the fourth scan line driver circuit clock signal GCK4 is shifted from the first scan line driver circuit clock signal GCK1 by 3/4 period.

The first pulse width control signal PWC1 in FIG. 2B periodically repeats the high-level potential and the low-level potential and has a duty ratio of 1/3. The phase of the second pulse width control signal PWC2 is shifted from the first pulse width control signal PWC1 by 1/6 period. The phase of the third pulse width control signal PWC3 is shifted from the first pulse width control signal PWC1 by 1/3 period. The phase of the fourth pulse width control signal PWC4 is shifted from the first pulse width control signal PWC1 by 1/2 period. The phase of the fifth pulse width control signal PWC5 is shifted from the first pulse width control signal PWC1 by 2/3 period. The phase of the sixth pulse width control signal PWC6 is shifted from the first pulse width control signal PWC1 by 5/6 period.

Note that here, the ratio of the pulse width of each of the first to fourth scan line driver circuit clock signals GCK1 to GCK4 to the pulse width of each of the first to sixth pulse width control signals PWC1 to PWC6 is 3:2.

In the liquid crystal display device, circuits with the same structure can be used as the first to m-th pulse output circuits 20_1 to 20_m. Note that electrical connection relations of a plurality of terminals included in the pulse output circuit differ depending on the pulse output circuits. Specific connection relations are described with reference to FIGS. 2A and 2C.

Each of the first to m-th pulse output circuits 20_1 to 20_m has terminals 21 to 27. The terminals 21 to 24 and the terminal 26 are input terminals. The terminals 25 and 27 are output terminals.

First, the terminal 21 is described. The terminal 21 in the first pulse output circuit 20_1 is electrically connected to a wiring that supplies the scan line driver circuit start signal GSP. The terminal 21 in each of the second to m-th pulse output circuits 20_2 to 20_m is electrically connected to the terminal 27 in the pulse output circuit in the preceding stage.

Next, the terminal 22 is described. The terminal 22 in the (4a−3)th pulse output circuit (a is a natural number of less than or equal to (m/4)) is electrically connected to the wiring that supplies the first scan line driver circuit clock signal GCK1. The terminal 22 in the (4a−2)th pulse output circuit is electrically connected to the wiring that supplies the second scan line driver circuit clock signal GCK2. The terminal 22 in the (4a−1)th pulse output circuit is electrically connected to the wiring that supplies the third scan line driver circuit clock signal GCK3. The terminal 22 in the 4a-th pulse output circuit is electrically connected to the wiring that supplies the fourth scan line driver circuit clock signal GCK4.

Then, the terminal 23 is described. The terminal 23 in the (4a−3)th pulse output circuit is electrically connected to the wiring that supplies the second scan line driver circuit clock signal GCK2. The terminal 23 in the (4a−2)th pulse output circuit is electrically connected to the wiring that supplies the third scan line driver circuit clock signal GCK3. The terminal 23 in the (4a−1)th pulse output circuit is electrically connected to the wiring that supplies the fourth scan line driver circuit clock signal GCK4. The terminal 23 in the 4a-th pulse output circuit is electrically connected to the wiring that supplies the first scan line driver circuit clock signal GCK1.

Next, the terminal 24 is described. The terminal 24 in the (2b−1)th pulse output circuit (b is a natural number of less than or equal to (k/2)) is electrically connected to the wiring that supplies the first pulse width control signal PWC1. The terminal 24 in the 2b-th pulse output circuit is electrically connected to the wiring that supplies the fourth pulse width control signal PWC4. The terminal 24 in the (2c−1)th pulse output circuit (c is a natural number of more than or equal to ((k/2)+1) and less than or equal to k) is electrically connected to the wiring that supplies the second pulse width control signal PWC2. The terminal 24 in the 2c-th pulse output circuit is electrically connected to the wiring that supplies the fifth pulse width control signal PWC5. The terminal 24 in the (2d−1)th pulse output circuit (d is a natural number of more than or equal to (k+1) and less than or equal to (m/2)) is electrically connected to the wiring that supplies the third pulse width control signal PWC3. The terminal 24 in the 2d-th pulse output circuit is electrically connected to the wiring that supplies the sixth pulse width control signal PWC6.

Then, the terminal 25 is described. The terminal 25 in the x-th pulse output circuit (x is a natural number of m or less) is electrically connected to the scan line 13_x in the x-th row.

Next, the terminal 26 is described. The terminal 26 in the y-th pulse output circuit (y is a natural number of less than or equal to (m−1)) is electrically connected to the terminal 27 in the (y+1)th pulse output circuit. The terminal 26 in the m-th pulse output circuit is electrically connected to a wiring that supplies an m-th pulse output circuit stop signal STP.

Note that if an (m+1)th pulse output circuit is provided, the m-th pulse output circuit stop signal STP corresponds to a signal output from the terminal 27 in the (m+1)th pulse output circuit. Specifically, the m-th pulse output circuit stop signal STP can be supplied to the m-th pulse output circuit by provision of the (m+1)th pulse output circuit as a dummy circuit or by direct input of the signal from the outside.

The connection relation of the terminal 27 in each of the pulse output circuits is described above. Thus, the above description is referred to here.

<Structure Example of Pulse Output Circuit>

Figure 2C:
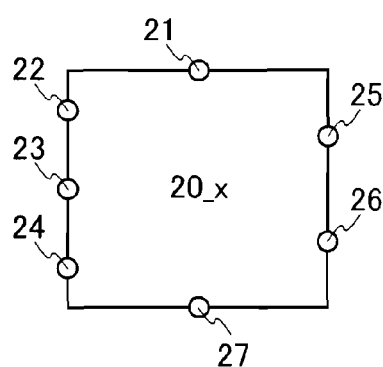
Figure 3A:
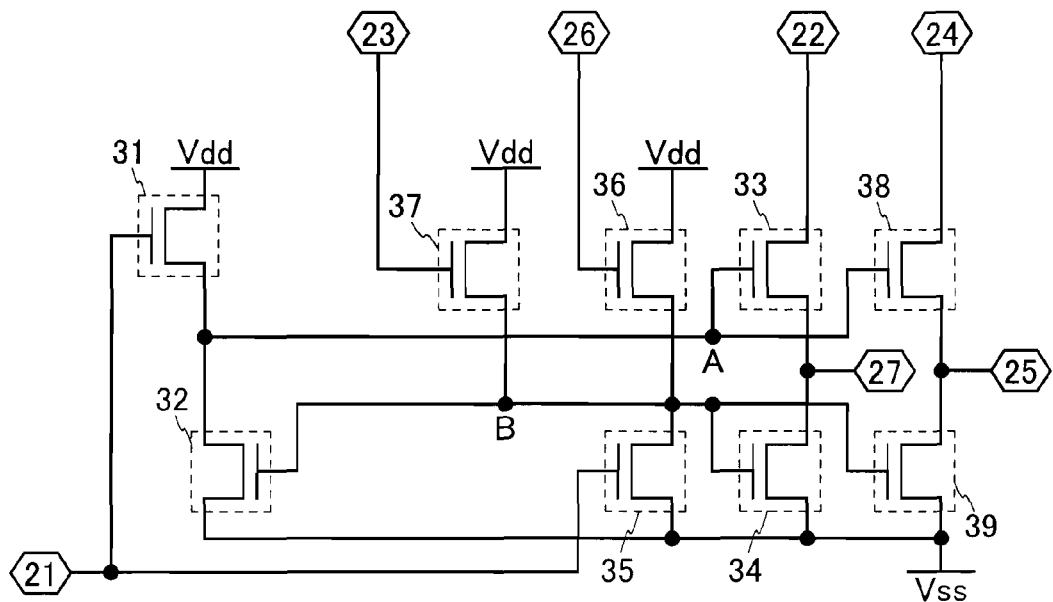
FIG. 3A is a circuit diagram illustrating an example of a pulse output circuit.

FIG. 3A illustrates a structure example of the pulse output circuit illustrated in FIGS. 2A and 2C. The pulse output circuit illustrated in FIG. 3A includes transistors 31 to 39.

One of a source and a drain of the transistor 31 is electrically connected to a wiring that supplies the high power supply potential Vdd (hereinafter also referred to as a high power supply potential line). A gate of the transistor 31 is electrically connected to the terminal 21.

One of a source and a drain of the transistor 32 is electrically connected to a wiring that supplies the low power supply potential Vss (hereinafter also referred to as a low power supply potential line). The other of the source and the drain of the transistor 32 is electrically connected to the other of the source and the drain of the transistor 31.

One of a source and a drain of the transistor 33 is electrically connected to the terminal 22. The other of the source and the drain of the transistor 33 is electrically connected to the terminal 27. A gate of the transistor 33 is electrically connected to the other of the source and the drain of the transistor 31 and the other of the source and the drain of the transistor 32.

One of a source and a drain of the transistor 34 is electrically connected to the low power supply potential line. The other of the source and the drain of the transistor 34 is electrically connected to the terminal 27. A gate of the transistor 34 is electrically connected to a gate of the transistor 32.

One of a source and a drain of the transistor 35 is electrically connected to the low power supply potential line. The other of the source and the drain of the transistor 35 is electrically connected to the gate of the transistor 32 and the gate of the transistor 34. A gate of the transistor 35 is electrically connected to the terminal 21.

One of a source and a drain of the transistor 36 is electrically connected to the high power supply potential line. The other of the source and the drain of the transistor 36 is electrically connected to the gate of the transistor 32, the gate of the transistor 34, and the other of the source and the drain of the transistor 35. A gate of the transistor 36 is electrically connected to the terminal 26.

One of a source and a drain of the transistor 37 is electrically connected to the high power supply potential line. The other of the source and the drain of the transistor 37 is electrically connected to the gate of the transistor 32, the gate of the transistor 34, the other of the source and the drain of the transistor 35, and the other of the source and the drain of the transistor 36. A gate of the transistor 37 is electrically connected to the terminal 23.

One of a source and a drain of the transistor 38 is electrically connected to the terminal 24. The other of the source and the drain of the transistor 38 is electrically connected to the terminal 25. A gate of the transistor 38 is electrically connected to the other of source and the drain of the transistor 31, the other of the source and the drain of the transistor 32, and the gate of transistor 33.

One of a source and a drain of the transistor 39 is electrically connected to the low power supply potential line. The other of the source and the drain of the transistor 39 is electrically connected to the terminal 25. A gate of the transistor 39 is electrically connected to the gate of the transistor 32, the gate of the transistor 34, the other of the source and the drain of the transistor 35, the other of the source and the drain of the transistor 36, and the other of the source and the drain of the transistor 37.

Note that in the following description, a node to which the other of the source and the drain of the transistor 31, the other of the source and the drain of the transistor 32, the gate of the transistor 33, and the gate of the transistor 38 are electrically connected is referred to as a node A. In addition, a node to which the gate of the transistor 32, the gate of the transistor 34, the other of the source and the drain of the transistor 35, the other of the source and the drain of the transistor 36, the other of the source and the drain of the transistor 37, and the gate of the transistor 39 are electrically connected is referred to as a node B.

<Operation Example of Pulse Output Circuit>

An operation example of the pulse output circuit is described with reference to FIGS. 3B to 3D. Note that here, the following case is described: an operation example at the time when timing of inputting the scan line driver circuit start pulse GSP to the terminal 21 in the first pulse output circuit 20_1 is controlled so that shift pulses are output from the terminals 27 in the first pulse output circuit 20_1, the (k+1)th pulse output circuit 20_(k+1), and the (2k+1)th pulse output circuit 20_(2k+1) at the same timing.

Figure 3B:
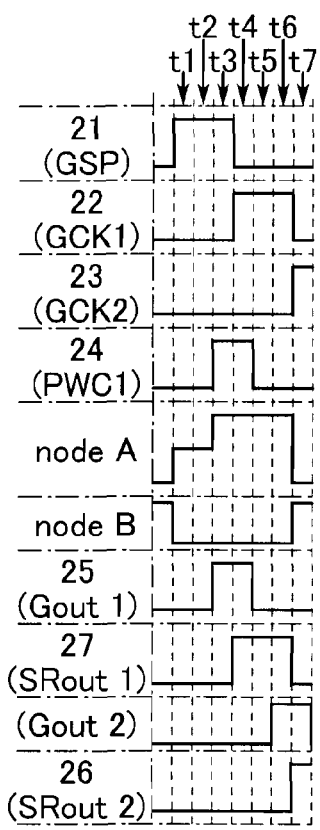
FIGS. 3B to 3D are timing charts of the pulse output circuit.

As a specific example, FIG. 3B illustrates the potentials of signals input to the terminals in the first pulse output circuit 20_1 and the potentials of the node A and the node B at the time when the scan line driver circuit start pulse GSP is input. FIG. 3C illustrates the potentials of signals input to the terminals in the (k+1)th pulse output circuit 20_(k+1) and the potentials of the node A and the node B at the time when the high-level potential is input from the k-th pulse output circuit 20_k. FIG. 3D illustrates the potentials of signals input to the terminals in the (2k+1)th pulse output circuit 20_(2k+1) and the potentials of the node A and the node B at the time when the high-level potential is input from the 2k-th pulse output circuit 20_2k.

Figure 3C:
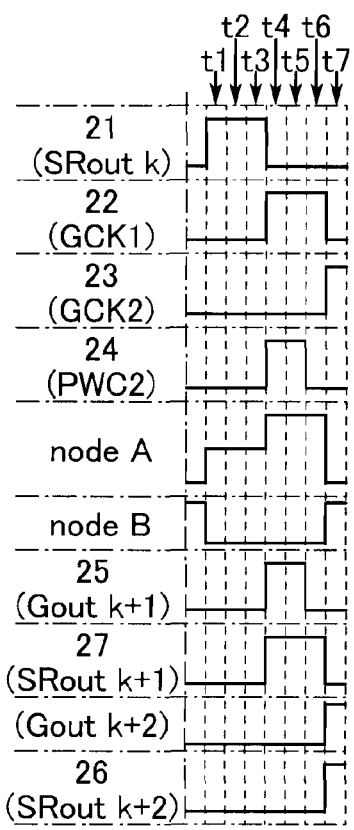
Figure 3D:
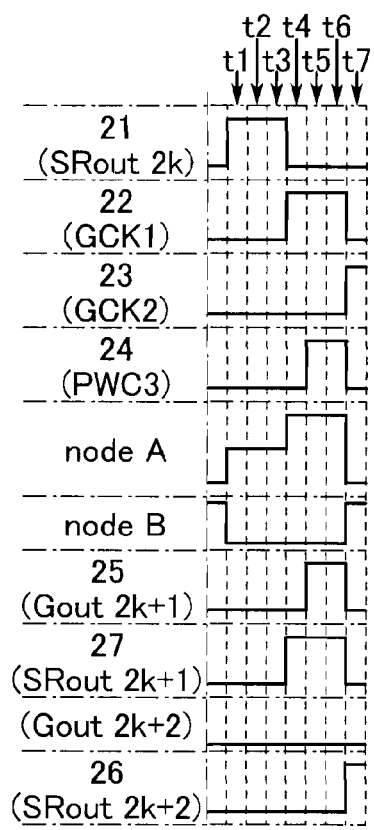

Note that in FIGS. 3B to 3D, the signals input to the terminals are provided in parentheses. Further, FIGS. 3B to 3D illustrate signals (Gout 2, Gout k+2, and Gout 2k+2) output from the terminals 25 in the pulse output circuits (the second pulse output circuit 20_2, the (k+2)th pulse output circuit 20_(k+2), and the (2k+2)th pulse output circuit 20_(2k+2)) provided in subsequent stages, and output signals of the terminals 27 in the pulse output circuits provided in subsequent stages (SRout 2: an input signal of the terminal 26 in the first pulse output circuit 20_1, SRout k+2: an input signal of the terminal 26 in the (k+1)th pulse output circuit 20_(k+1), and SRout 2k+2: an input signal of the terminal 26 in the (2k+1)th pulse output circuit 20_(2k+1)). Note that in FIGS. 3B and 3C, Gout represents an output signal from the pulse output circuit to the scan line, and SRout represents an output signal from the pulse output circuit to the pulse output circuit in the subsequent stage.

First, the case where the high-level potential is input to the first pulse output circuit 20_1 as the scan line driver circuit start pulse GSP is described with reference to FIG. 3B.

In a period t1, the high-level potential is input to the terminal 21. Thus, the transistors 31 and 35 are turned on. As a result, the potential of the node A is increased to a potential that is decreased from the high-level potential by the threshold voltage of the transistor 31, and the potential of the node B is decreased to the low-level potential. Consequently, the transistors 33 and 38 are turned on and the transistors 32, 34, and 39 are turned off.

Thus, in the period t1, a signal output from the terminal 27 is a signal input to the terminal 22, and a signal output from the terminal 25 is a signal input to the terminal 24. Here, in the period t1, both the signal input to the terminal 22 and the signal input to the terminal 24 have the low-level potentials. Accordingly, in the period t1, the first pulse output circuit 20_1 outputs the low-level potential to the terminal 21 in the second pulse output circuit 20_2 and the scan line provided in the first row in the pixel portion.

In a period t2, signals input to the terminals are not changed from those in the period t1. Thus, the signals output from the terminals 25 and 27 are not changed, and the low-level potentials are output from the terminals 25 and 27.

In a period t3, the high-level potential is input to the terminal 24. Note that the potential of the node A (the potential of the source of the transistor 31) is increased to the potential which is decreased from the high-level potential by the threshold voltage of the transistor 31 in the period t1. Thus, the transistor 31 is off. At this time, the high-level potential is input to the terminal 24, so that the potential of the node A (the potential of the gate of the transistor 38) is further increased by capacitive coupling of the source and the gate of the transistor 38 (bootstrap operation). Since the potential of the node A is increased by the bootstrap operation, the potential of the signal output from the terminal 25 is not decreased from the high-level potential input to the terminal 24. Accordingly, in the period t3, the first pulse output circuit 20_1 outputs the high-level potential (a selection signal) to the scan line provided in the first row in the pixel portion.

In a period t4, the high-level potential is input to the terminal 22. Here, since the potential of the node A is increased by the bootstrap operation, the potential of the signal output from the terminal 27 is not decreased from the high-level potential input to the terminal 22. Accordingly, in the period t4, the terminal 27 outputs the high-level potential which is input to the terminal 22. In other words, the first pulse output circuit 20_1 outputs the high-level potential (a shift pulse) to the terminal 21 in the second pulse output circuit 20_2. In the period t4, a signal input to the terminal 24 is kept at the high-level potential; thus, the signal which is output from the first pulse output circuit 20_1 to the scan line provided in the first row in the pixel portion is kept at the high-level potential (the selection signal). Note that the transistor 35 is turned off because the low-level potential is input to the terminal 21, which does not directly influence output signals of the pulse output circuit in the period t4.

In a period t5, the low-level potential is input to the terminal 24. Here, the transistor 38 is kept on. Accordingly, in the period t5, a signal output from the first pulse output circuit 20_1 to the scan line provided in the first row in the pixel portion has the low-level potential.

In a period t6, signals input to the terminals are not changed from those in the period t5. Thus, the signals output from the terminals 25 and 27 are not changed, the low-level potential is output from the terminal 25, and the high-level potential (the shift pulse) is output from the terminal 27.

In a period t7, the high-level potential is input to the terminal 23. Thus, the transistor 37 is turned on. Accordingly, the potential of the node B is increased from a potential which is decreased from the high-level potential by the threshold voltage of the transistor 37. That is, the transistors 32, 34, and 39 are turned on. Consequently, the potential of the node A is decreased to the low-level potential. That is, the transistors 33 and 38 are turned off. Thus, in the period t7, both the signals output from the terminals 25 and 27 have the low-level potentials. In other words, in the period t7, the first pulse output circuit 20_1 outputs the low-level potential to the terminal 21 in the second pulse output circuit 20_2 and the scan line provided in the first row in the pixel portion.

Next, the case where the high-level potential is input as a shift pulse from the k-th pulse output circuit 20_k to the terminal 21 in the (k+1)th pulse output circuit 20_(k+1) is described with reference to FIG. 3C.

In the period t1 and the period t2, the operation of the (k+1)th pulse output circuit 20_(k+1) is performed in a manner similar to that of the first pulse output circuit 20_1. Thus, the above description is referred to here.

In the period t3, signals input to the terminals are not changed from those in the period t2. Thus, the signals output from the terminals 25 and 27 are not changed, and the low-level potentials are output from the terminals 25 and 27.

In the period t4, the high-level potential is input to the terminals 22 and 24. Note that the potential of the node A (the potential of the source of the transistor 31) is increased to the potential which is decreased from the high-level potential by the threshold voltage of the transistor 31 in the period t1. Thus, the transistor 31 is off in the period t1. Here, the high-level potential is input to the terminals 22 and 24, so that the potential of the node A (the potentials of the gates of the transistors 33 and 38) is further increased by capacitive coupling of the source and the gate of the transistor 33 and capacitive coupling of the source and the gate of the transistor 38 (bootstrap operation). By the bootstrap operation, the potentials of the signals output from the terminals 25 and 27 are not decreased from the high-level potential input to the terminals 22 and 24. Thus, in the period t4, the (k+1)th pulse output circuit 20_(k+1) outputs the high-level potential (the selection signal or the shift pulse) to the scan line provided in the (k+1)th row in the pixel portion and the terminal 21 in the (k+2)th pulse output circuit 20_(k+2).

In the period t5, signals input to the terminals are not changed from those in the period t4. Thus, the signals output from the terminals 25 and 27 are not changed, and the high-level potential (the selection signal or the shift pulse) is output.

In the period t6, the low-level potential is input to the terminal 24. Here, the transistor 38 is kept on. Accordingly, in the period t6, a signal output from the (k+1)th pulse output circuit 20_(k+1) to the scan line provided in the first row in the pixel portion has the low-level potential.

In the period t7, the high-level potential is input to the terminal 23. Thus, the transistor 37 is turned on. Accordingly, the potential of the node B is increased from the potential which is decreased from the high-level potential by the threshold voltage of the transistor 37. That is, the transistors 32, 34, and 39 are turned on. Consequently, the potential of the node A is decreased to the low-level potential. That is, the transistors 33 and 38 are turned off. Thus, in the period t7, both the signals output from the terminals 25 and 27 have the low-level potentials. In other words, in the period t7, the (k+1)th pulse output circuit 20_(k+1) outputs the low-level potential to the terminal 21 in the (k+2)th pulse output circuit 20_(k+2) and the scan line provided in the (k+1)th row in the pixel portion.

Next, the case where the high-level potential is input as a shift pulse from the 2k-th pulse output circuit 20_2k to the terminal 21 in the (2k+1)th pulse output circuit 20_(2k+1) is described with reference to FIG. 3D.

In the periods t1 to t3, the operation of the (2k+1)th pulse output circuit 20_(2k+1) is performed in a manner similar to that of the (k+1)th pulse output circuit 20_(k+1). Thus, the above description is referred to here.

In the period t4, the high-level potential is input to the terminal 22. Note that the potential of the node A (the potential of the source of the transistor 31) is increased to the potential which is decreased from the high-level potential by the threshold voltage of the transistor 31 in the period t1. Thus, the transistor 31 is off in the period t1. Here, the high-level potential is input to the terminal 22, so that the potential of the node A (the potential of the gate of the transistor 33) is further increased by capacitive coupling of the source and the gate of the transistor 33 (bootstrap operation). By the bootstrap operation, the potential of the signal output from the terminal 27 is not decreased from the high-level potential input to the terminal 22. Thus, in the period t4, the (2k+1)th pulse output circuit 20_(2k+1) outputs the high-level potential (the shift pulse) to the terminal 21 in the (2k+2)th pulse output circuit 20_(2k+2). Note that the transistor 35 is turned off because the low-level potential is input to the terminal 21, which does not directly influence output signals of the pulse output circuit in the period t4.

In the period t5, the high-level potential is input to the terminal 24. Here, since the potential of the node A is increased by the bootstrap operation, the potential of the signal output from the terminal 25 is not decreased from the high-level potential input to the terminal 24. Accordingly, in the period t5, the terminal 25 outputs the high-level potential which is input to the terminal 24. In other words, the (2k+1)th pulse output circuit 20_(2k+1) outputs the high-level potential (the selection signal) to a scan line provided in a (2k+1)th row in the pixel portion. In the period t5, a signal input to the terminal 22 is kept at the high-level potential; thus, the signal which is output from the (2k+1)th pulse output circuit 20_(2k+1) to the terminal 21 in the (2k+2)th pulse output circuit 20_(2k+2) is kept at the high-level potential (the shift pulse).

In the period t6, signals input to the terminals are not changed from those in the period t5. Thus, the signals output from the terminals 25 and 27 are not changed, and the high-level potentials (the selection signals or the shift pulses) are output from the terminals 25 and 27.

In the period t7, the high-level potential is input to the terminal 23. Thus, the transistor 37 is turned on. Accordingly, the potential of the node B is increased from the potential which is decreased from the high-level potential by the threshold voltage of the transistor 37. That is, the transistors 32, 34, and 39 are turned on. Consequently, the potential of the node A is decreased to the low-level potential. That is, the transistors 33 and 38 are turned off. Thus, in the period t7, both the signals output from the terminals 25 and 27 have the low power supply potentials. In other words, in the period t7, the (2k+1)th pulse output circuit 20_(2k+1) outputs the low power supply potential to the terminal 21 in the (2k+2)th pulse output circuit 20_(2k+2) and the scan line provided in the (2k+1)th row in the pixel portion.

As illustrated in FIGS. 3B to 3D, timing of inputting the scan line driver circuit start pulse GSP is controlled in the first to m-th pulse output circuits 20_1 to 20_m, so that a plurality of shift pulses can be shifted concurrently. Specifically, after the scan line driver circuit start pulse GSP is input, the scan line driver circuit start pulse GSP is input again at the same timing as the output of a shift pulse from the terminal 27 in the k-th pulse output circuit 20_k, so that shift pulses can be output at the same timing from the first pulse output circuit

20_1 and the (k+1)th pulse output circuit 20_(k+1). Similarly, the scan line driver circuit start pulse GSP is input, so that shift pulses can be output from the first pulse output circuit 20_1, the (k+1)th pulse output circuit 20_(k+1), and the (2k+1)th pulse output circuit 20_(2k+1) at the same timing.

In addition, the first pulse output circuit 20_1, the (k+1)th pulse output circuit 20_(k+1), and the (2k+1)th pulse output circuit 20_(2k+1) can supply selection signals to the scan lines at different timings in parallel to the operation. In other words, the scan line driver circuit can shift a plurality of shift pulses having specific shift periods, and a plurality of pulse output circuits to which shift pulses are input at the same timing can supply selection signals to the scan lines at different timings.

<Structure Example of Signal Line Driver Circuit 12>

Figure 4A:
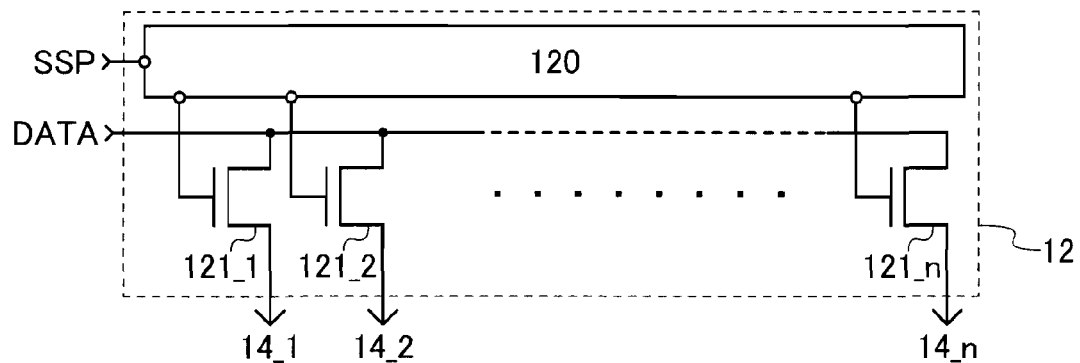
FIG. 4A illustrates a structure example of a signal line driver circuit.

FIG. 4A illustrates a structure example of the signal line driver circuit 12 included in the liquid crystal display device illustrated in FIG. 1A. The signal line driver circuit 12 illustrated in FIG. 4A includes a shift register 120 having first to n-th output terminals, a wiring that supplies a video signal DATA, and transistors 121_1 to 121_n. One of a source and a drain of the transistor 121_1 is electrically connected to the wiring that supplies the video signal DATA. The other of the source and the drain of the transistor 121_1 is electrically connected to a signal line 14_1 provided in a first column in the pixel portion. A gate of the transistor 121_1 is electrically connected to the first output terminal of the shift register 120. One of a source and a drain of the transistor 121_n is electrically connected to the wiring that supplies the video signal DATA. The other of the source and the drain of the transistor 121_n is electrically connected to a signal line 14n provided in an n-th column in the pixel portion. A gate of the transistor 121_n is electrically connected to the n-th output terminal of the shift register 120.

Note that the shift register 120 has a function of sequentially outputting a high-level potential from the first to n-th output terminals in each shift period in response to a signal line driver circuit start pulse SSP. That is, the transistors 121_1 to 121_n are sequentially turned on in each shift period.

Figure 4B:
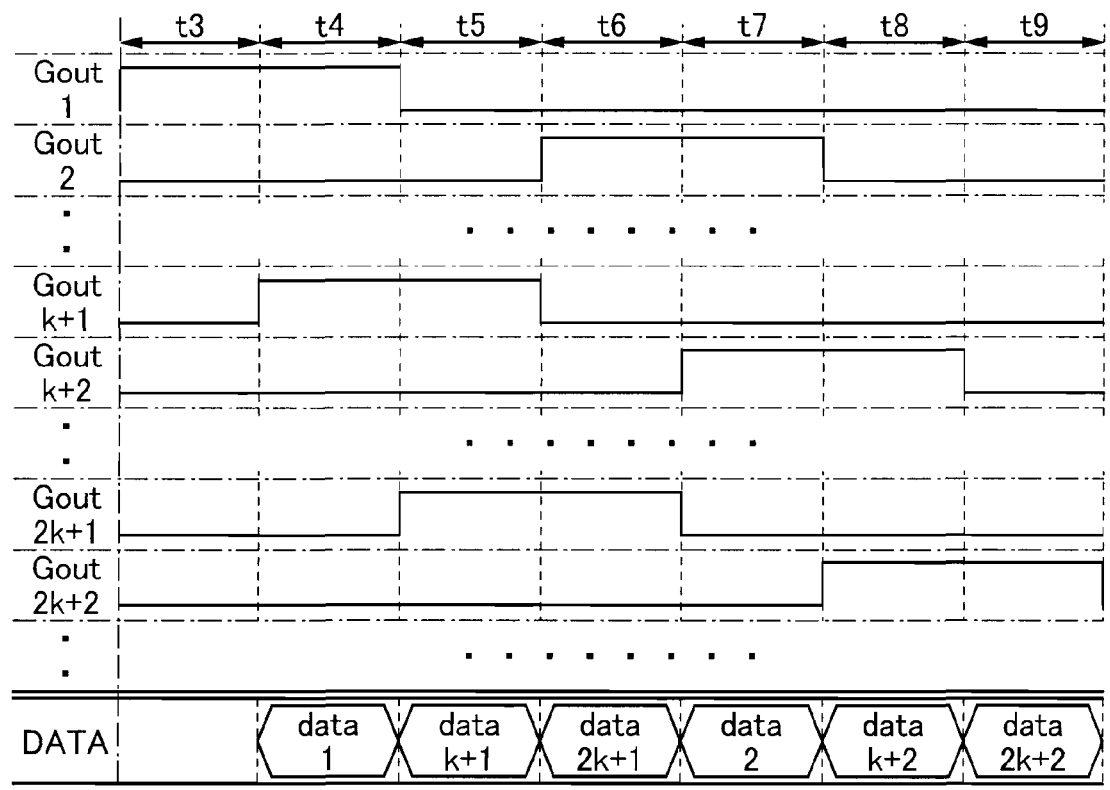
FIG. 4B is a timing chart of the signal line driver circuit.

FIG. 4B illustrates an example of timing of a video signal supplied through the wiring that supplies the video signal DATA. As illustrated in FIG. 4B, the wiring that supplies the video signal DATA supplies a video signal (data 1) for a pixel provided in the first row in the period t4, a video signal (data k+1) for a pixel provided in the (k+1)th row in the period t5, a video signal (data 2k+1) for a pixel provided in the (2k+1)th row in the period t6, and a video signal (data 2) for a pixel provided in the second row in the period t7. In this manner, the wiring that supplies the video signal DATA supplies video signals for pixels provided in given rows sequentially. When it is generalized, the wiring that supplies the video signal DATA sequentially supplies a video signal for a pixel provided in the s-th row (s is a natural number of less than k), a video signal for a pixel provided in the (k+s)th row, a video signal for a pixel provided in the (2k+s)th row, and a video signal for a pixel provided in the (s+1)th row.

By the operation of the scan line driver circuit and the signal line driver circuit, video signals can be input to the pixels provided in three rows in the pixel portion in each shift period of the pulse output circuit included in the scan line driver circuit.

<Structure Example of Backlight>

Figure 5:
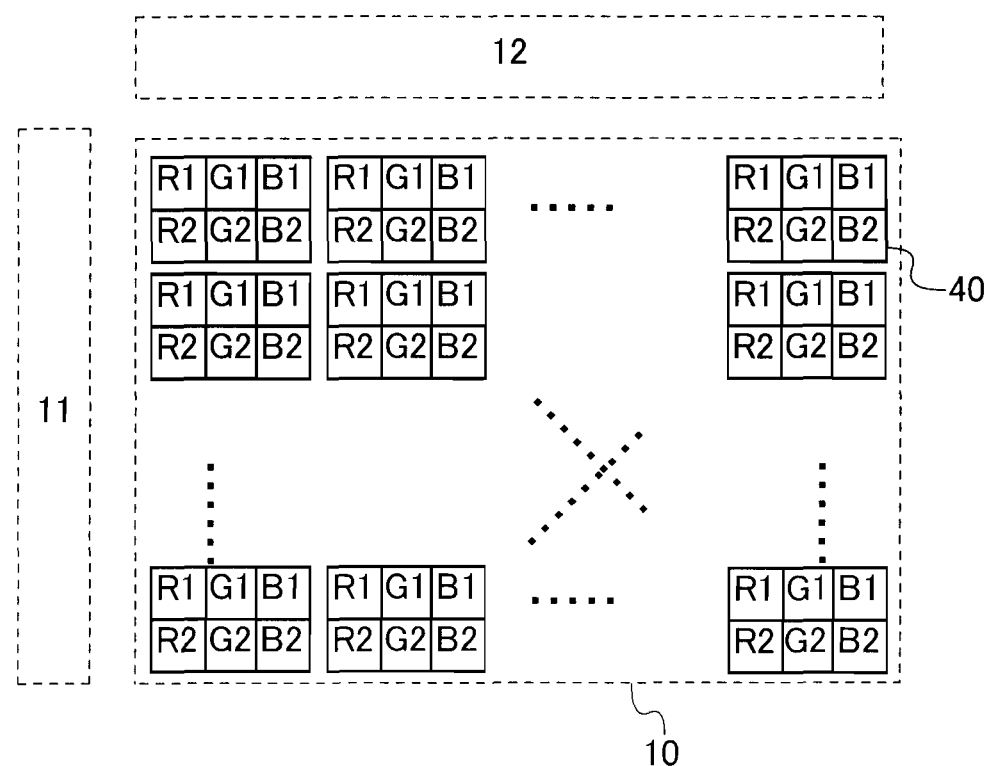
FIG. 5 illustrates a structure example of a backlight.

FIG. 5 illustrates a structure example of a backlight provided behind the pixel portion 10 in the liquid crystal display device illustrated in FIG. 1A. The backlight illustrated in FIG. 5 includes a plurality of backlight units 40 each including light sources of six colors: red (also referred to as R1 or first red) in a first red wavelength band, green (also referred to as G1 or first green) in a first green wavelength band, blue (also referred to as B1 or first blue) in a first blue wavelength band, red (also referred to as R2 or second red) in a second red wavelength band, green (also referred to as G2 or second green) in a second green wavelength band, and blue (also referred to as B2 or second blue) in a second blue wavelength band.

Note that the plurality of backlight units 40 are arranged in matrix and lighting of the backlight units 40 can be controlled in each given region. Here, the backlight units 40 are provided at least every t rows (t is a natural number of (k/N) (N is a natural number) and is (k/4) in this embodiment, for example) as a backlight for the plurality of pixels 15 provided in the m rows by the n columns, and lighting of the backlight units 40 can be controlled independently. In other words, the backlight includes at least a backlight unit for the first to t-th rows to a backlight unit for the (2k+3t+1)th to m-th rows, and lighting of the backlight units 40 can be controlled independently.

Further, in the backlight unit 40, lighting of the light sources of the six colors (R1, R2, G1, G2, B1, and B2) can be controlled independently. In other words, in the backlight unit 40, when the light source of any one of R1, R2, G1, G2, B1, and B2 is lit, the pixel portion 10 can be irradiated with light of any one of R1, R2, G1, G2, B1, and B2.

Figure 13A:
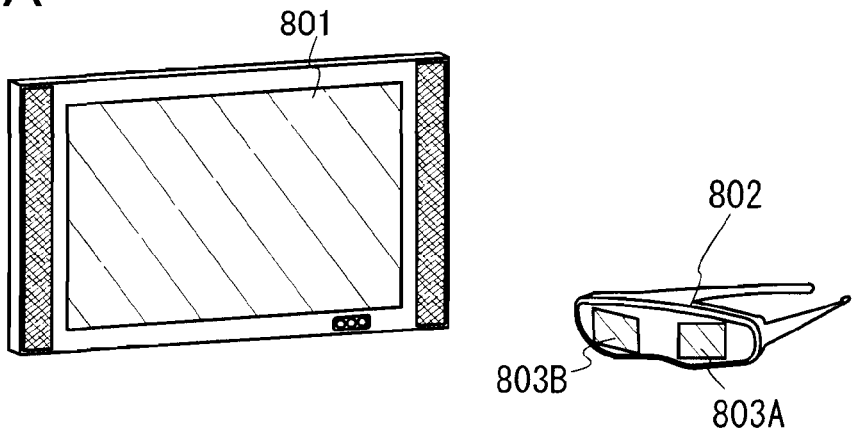
FIGS. 13A to 13D is diagrams for illustrating a wavelength separation method.
Figure 13B:
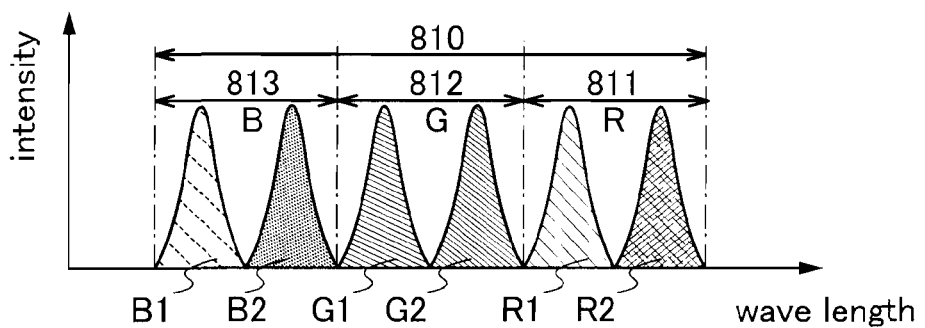
Figure 13C:
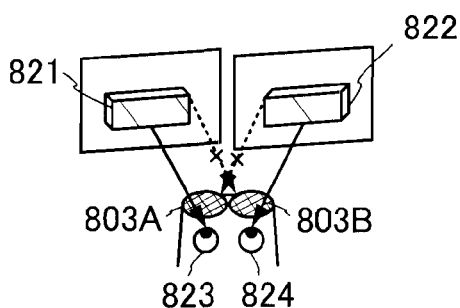
Figure 13D:
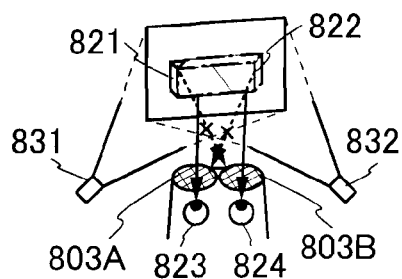

Note that as in the description in FIG. 13B, the first red wavelength band R1 is a red wavelength band on a short wavelength side. The second red wavelength band R2 is a red wavelength band on a long wavelength side. The first green wavelength band G1 is a green wavelength band on a short wavelength side. The second green wavelength band G2 is a green wavelength band on a long wavelength side. The first blue wavelength band B1 is a blue wavelength band on a short wavelength side. The second blue wavelength band B2 is a blue wavelength band on a long wavelength side.

Note that the wavelength band on the long wavelength side and the wavelength band on the short wavelength side of each color may be wavelength bands based on the characteristics of a spectral filter for left eye and a spectral filter for right eye that are included in eyeglasses for visually identifying an image in a liquid crystal display device.

<Operation Example of Liquid Crystal Display Device>

Figure 6:
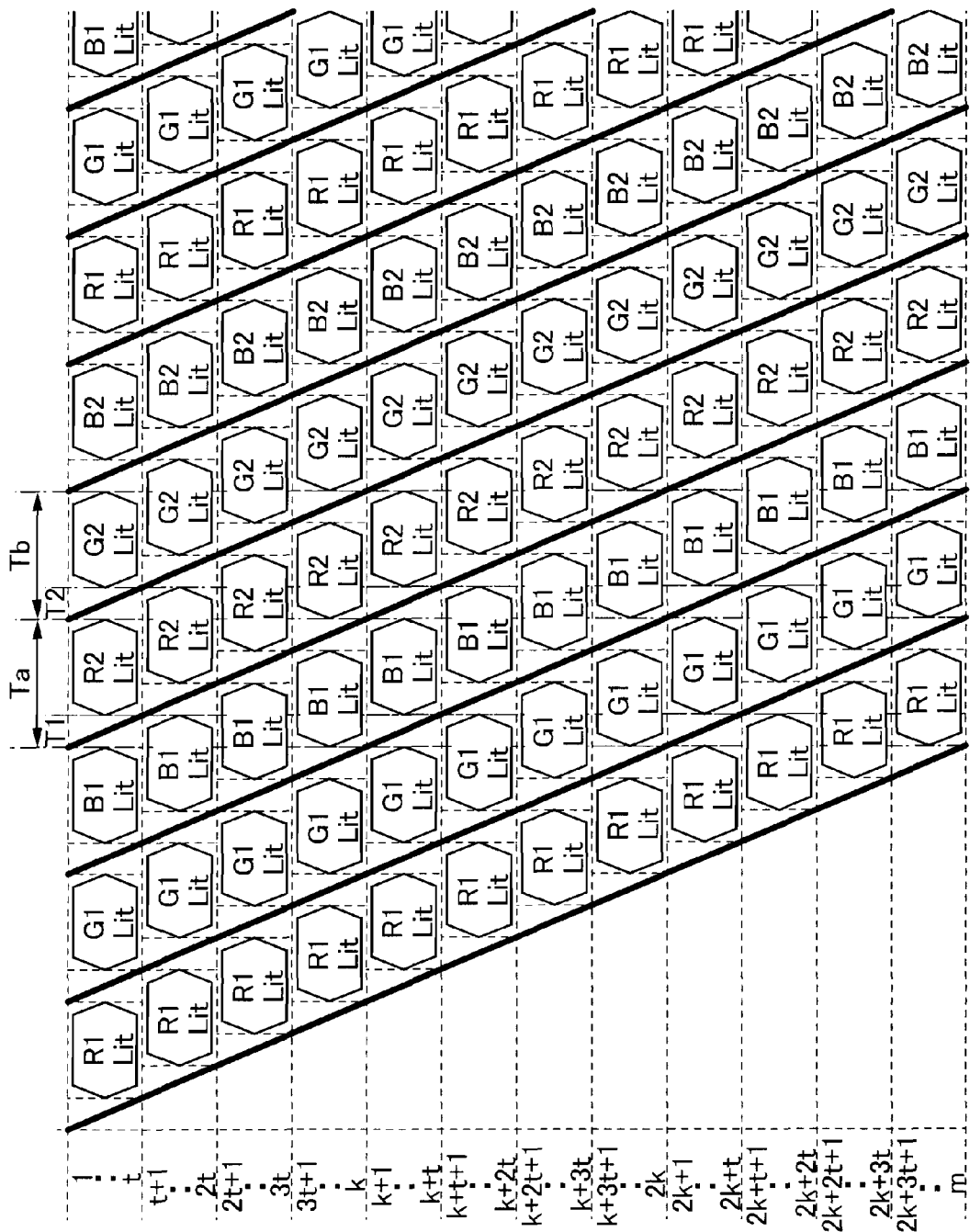
FIG. 6 illustrates an operation example of a liquid crystal display device.

FIG. 6 illustrates timing of scanning selection signals in the liquid crystal display device and timing of lighting the backlight unit for the first to t-th rows to the backlight unit for the (2k+3t+1)th to m-th rows included in the backlight. Note that in FIG. 6, the vertical axis represents rows (the first to m-th rows) in the pixel portion, and the horizontal axis represents time.

As illustrated in FIG. 6, in the liquid crystal display device, selection signals are not sequentially supplied to the scan lines provided in the first to m-th rows, but the selection signals can be sequentially supplied to the scan lines with an interval of k rows in the following order: the scan line provided in the first row; the scan line provided in the (k+1)th row; the scan line provided in the (2k+1)th row; and the scan line provided in the second row. Thus, in a period T1, n pixels provided in the first row to n pixels provided in the t-th row are sequentially selected, n pixels provided in the (k+1)th row to n pixels provided in the (k+t)th row are sequentially selected, and n pixels provided in the (2k+1)th row to the n pixels 15 provided in the (2k+t)th row are sequentially selected, so that video signals can be input to the pixels.

In a period Ta including the period T1, video signals for controlling transmission of light of a first color are input to the plurality of pixels provided in the first to k-th rows. In addition, in the period Ta, video signals for controlling transmission of light of a second color are input to the plurality of pixels provided in the (k+1)th to 2k-th rows. Further, in the period Ta, video signals for controlling transmission of light of a third color are input to the plurality of pixels provided in the (2k+1)th to m-th rows.

In the period T1 illustrated in FIG. 6, video signals for controlling transmission of light from the light source of R2 that is light of the first color are input to the n pixels provided in the first row to the n pixels provided in the t-th row, video signals for controlling transmission of light from the light source of B1 that is light of the second color are input to the n pixels provided in the (k+1)th row to the n pixels provided in the (k+t)th row, and video signals for controlling transmission of light from the light source of G1 that is light of the third color are input to the n pixels provided in the (2k+1)th row to the n pixels provided in the (2k+t)th row.

In the period Ta including the period T1 illustrated in FIG. 6, the light source of R2 that is the first color can be lit in the backlight unit for the first to t-th rows, the light source of B1 that is the second color can be lit in the backlight unit for the (k+1)th to (k+t)th rows, and the light source of G1 that is the third color can be lit in the backlight unit for the (2k+1)th to (2k+t)th rows.

Similarly, in a period Tb including a period T2, video signals for controlling transmission of light of a first color are input to the plurality of pixels provided in the first to k-th rows. In addition, in the period Tb, video signals for controlling transmission of light of a second color are input to the plurality of pixels provided in the (k+1)th to 2k-th rows. Further, in the period Tb, video signals for controlling transmission of light of a third color are input to the plurality of pixels provided in the (2k+1)th to m-th rows.

In the period T2 illustrated in FIG. 6, video signals for controlling transmission of light from the light source of G2 that is light of the first color are input to the n pixels provided in the first row to the n pixels provided in the t-th row, video signals for controlling transmission of light from the light source of R2 that is light of the second color are input to the n pixels provided in the (k+1)th row to the n pixels provided in the (k+t)th row, and video signals for controlling transmission of light from the light source of B1 that is light of the third color are input to the n pixels provided in the (2k+1)th row to the n pixels provided in the (2k+t)th row.

In the period Tb including the period T2 illustrated in FIG. 6, the light source of G2 that is the first color can be lit in the backlight unit for the first to t-th rows, the light source of R2 that is the second color can be lit in the backlight unit for the (k+1)th to (k+t)th rows, and the light source of B1 that is the third color can be lit in the backlight unit for the (2k+1)th to (2k+t)th rows.

As in the periods Ta and Tb, in the liquid crystal display device illustrated in FIG. 6, video signals for controlling transmission of light from the light sources of R1, G1, B1, R2, G2, and B2 are input to the n pixels provided in the first row to the n pixels provided in the t-th row, and then, irradiation with light from the light sources in accordance with the video signals is sequentially performed. Similarly, video signals for controlling transmission of light from the light sources of R1, G1, B1, R2, G2, and B2 are input to n pixels provided in the (t+1)th row to n pixels provided in the 2t-th row and n pixels provided in the (2k+3t+1)th row to n pixels provided in the m-th row, and then, irradiation with light from the light sources in accordance with the video signals is sequentially performed.

Figure 7:
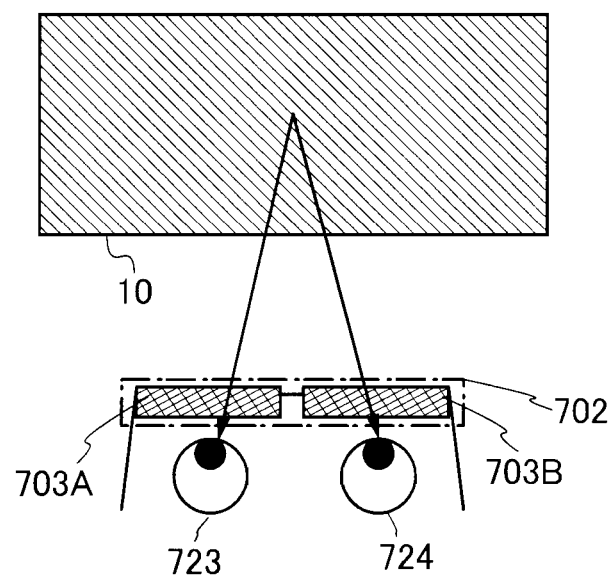
FIG. 7 illustrates an operation example of a liquid crystal display device.

As illustrated in FIG. 7, with the use of eyeglasses 702 including a spectral filter 703A for left eye and a spectral filter 703B for right eye, different images can be visually identified with left eye 723 and right eye 724 in the pixel portion 10 on which the images are displayed by the operation of the liquid crystal display device in FIG. 6.

Figure 8:
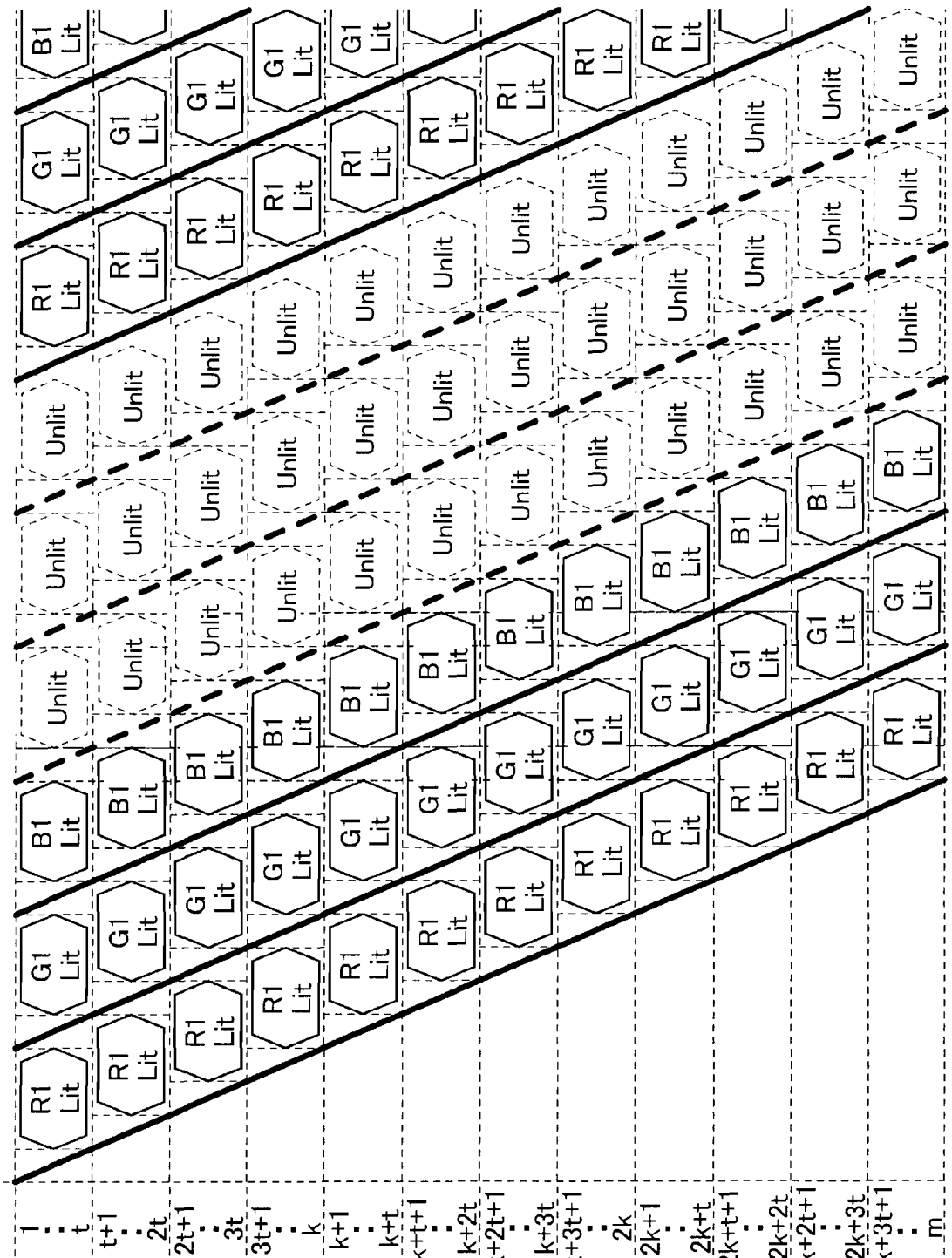
FIG. 8 illustrates an operation example of a liquid crystal display device.

Next, FIG. 8 illustrates scanning of selection signals in the liquid crystal display device while the light sources of R1, G1, and B1 in which transmission of light seen with the left eye 723 through the spectral filter 703A for the left eye is controlled is focused and timing of lighting the backlight unit for the first to t-th rows to the backlight unit for the (2k+3t+1)th to m-th rows included in the backlight. Note that in FIG. 8, the vertical axis represents rows (the first to m-th rows) in the pixel portion, and the horizontal axis represents time.

FIG. 8 differs from FIG. 6 in that irradiation with light from the light sources of R1, G1, and B1 that is seen with the left eye 723 through the spectral filter 703A for the left eye and input of video signals for controlling transmission of the light are illustrated and that irradiation with light from the light sources of R2, G2, and B2 that is not seen with the left eye 723 through the spectral filter 703A for the left eye is illustrated as an unlit state. Note that in FIG. 8, irradiation with light from the light sources of R2, G2, and B2 that is not seen with the left eye 723 and video signals for controlling transmission of the light are represented by dotted lines.

As shown in FIG. 8, the left eye 723 visually identifies an image (also referred to as a first image) in a field-sequential liquid crystal display device by sequential irradiation of light from the light sources of R1, G1, and B1. In addition, the left eye 723 perceives a period in which sequential irradiation with light from the light sources of R2, G2, and B2 that is not seen through the spectral filter 703A for the left eye as an unlit state; thus, the period is perceived as a black display period. In other words, when black display is represented by K, the left eye 723 sees sequential irradiation with light from R1, G1, B1, K, K, and K.

Figure 9:
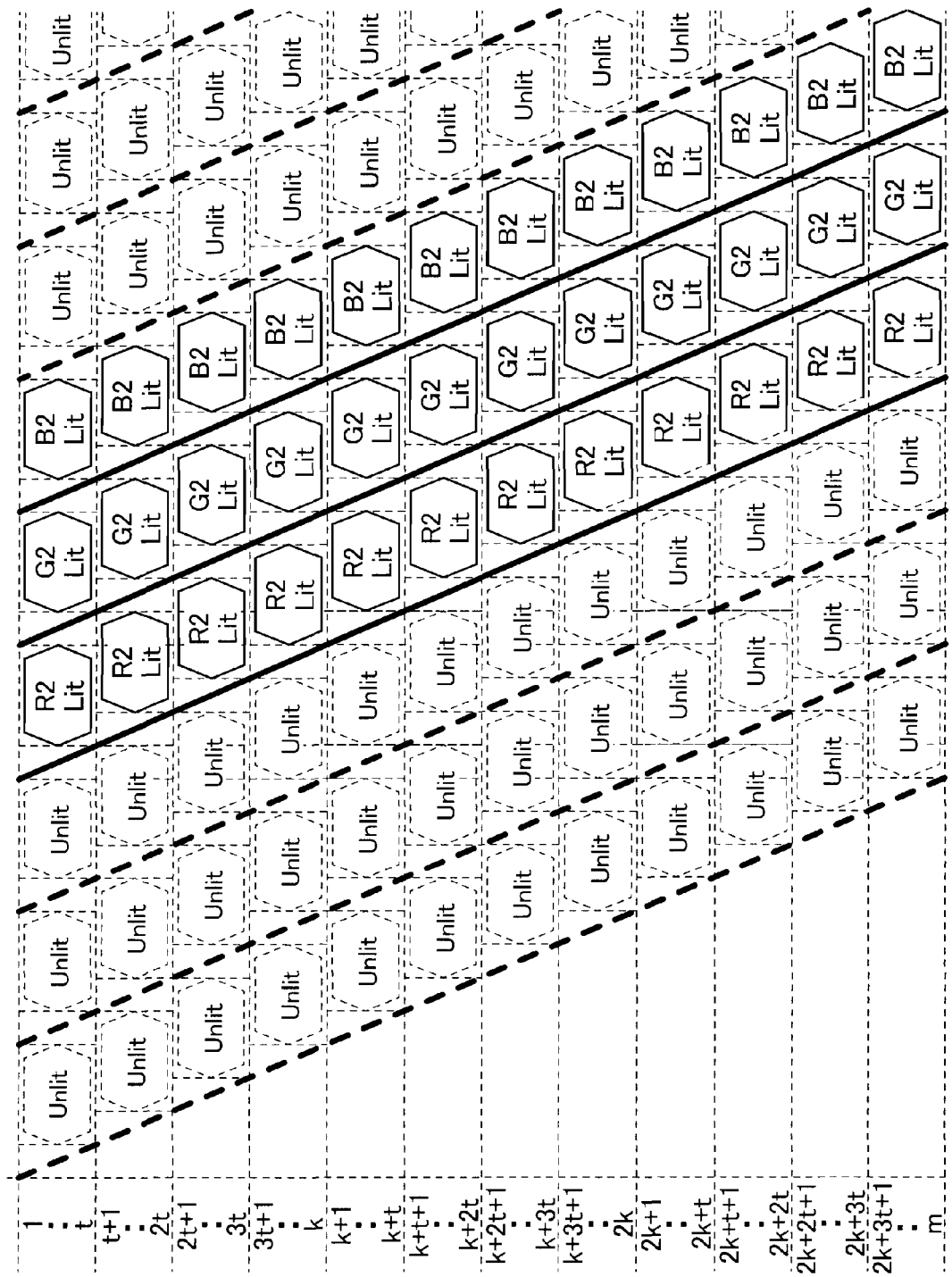
FIG. 9 illustrates an operation example of a liquid crystal display device.

As in FIG. 8, FIG. 9 illustrates scanning of selection signals in the liquid crystal display device while the light sources of R2, G2, and B2 in which transmission of light seen with the right eye through the spectral filter for the right eye is controlled is focused and timing of lighting the backlight unit for the first to t-th rows to the backlight unit for the (2k+3t+1)th to m-th rows included in the backlight. Note that in FIG. 9, the vertical axis represents rows (the first to m-th rows) in the pixel portion, and the horizontal axis represents time.

FIG. 9 differs from FIG. 6 in that irradiation with light from the light sources of R2, G2, and B2 that is seen with the right eye 724 through the spectral filter 703B for the right eye and input of video signals for controlling transmission of the light are illustrated and that irradiation with light from the light sources of R1, G1, and B1 that is not seen with the right eye 724 through the spectral filter 703B for the right eye is illustrated as an unlit state. Note that in FIG. 9, irradiation with light from the light sources of R1, G1, and B1 that is not seen with the right eye 724 and video signals for controlling the transmission of the light are represented by dotted lines.

As shown in FIG. 9, the right eye 724 visually identifies an image (also referred to as a second image) in the field-sequential liquid crystal display device by sequential irradiation of light from the light sources of R2, G2, and B2. In addition, the right eye 724 perceives a period in which sequential irradiation with light from the light sources of R1, G1, and B1 that is not seen through the spectral filter 703B for the right eye as an unlit state; thus, the period is perceived as a black display period. In other words, when black display is represented by K, the right eye 724 sees sequential irradiation with light from K, K, K, R2, G2, and B2.

Accordingly, a viewer visually identify the first image and the second image that are displayed by the field-sequential method separately with the left eye 723 and the right eye 724 by the wavelength division method. The viewer can simulate parallax at the time when a stereoscopic object is visually identified; thus, a stereoscopic image can be displayed.

Note that the shape of the eyeglasses 702 is not limited to the shape illustrated in FIG. 7. Any shape may be employed as long as the spectral filter 703A for the left eye or the spectral filter 703B for the right eye transmits light when an image is visually identified with the left eye 723 or the right eye 724.

<Liquid Crystal Display Device Disclosed in this Embodiment>

In the liquid crystal display device in this embodiment, input of video signals and lighting of the backlight can be concurrently performed. Thus, the frequency of input of video signals to pixels in the liquid crystal display device can be increased, for example. Accordingly, color breakup generated in the field-sequential liquid crystal display device can be suppressed, and the quality of an image displayed by the liquid crystal display device can be improved.

In the liquid crystal display device disclosed in this embodiment, a pseudo stereoscopic image can be displayed by the simple operation. The ppi of the liquid crystal display device in this embodiment can be increased by field-sequential drive, and a stereoscopic image can be displayed by separation of an image for left eye and an image for right eye by the wavelength division method. As compared to pseudo stereoscopic display by a frame-sequential method, the decrease in image quality due to opening and closing of a shutter for left eye and a shutter for right eye provided in eyeglasses and crosstalk of the image for the left eye and the image for the right eye can be eliminated.

In particular in the operation of the liquid crystal display device in this embodiment, as illustrated in FIG. 6, FIG. 7, FIG. 8, and FIG. 9, light irradiation is sequentially performed from R1, G1, B1, K, K, and K so that the first image visually identified with the left eye is displayed and light irradiation is sequentially performed from K, K, K, R2, G2, and B2 so that the second image visually identified with the right eye is displayed. In other words, in the structure illustrated in FIG. 6, light irradiation is successively performed from R1 (R2), G1 (G2), and B1 (B2) by the field-sequential method, and then, black images are visually identified. Thus, loss of only data of any of the colors due to blinking or the like of the viewer can be reduced, and it is possible to make color breakup less likely be observed.

Figure 10:
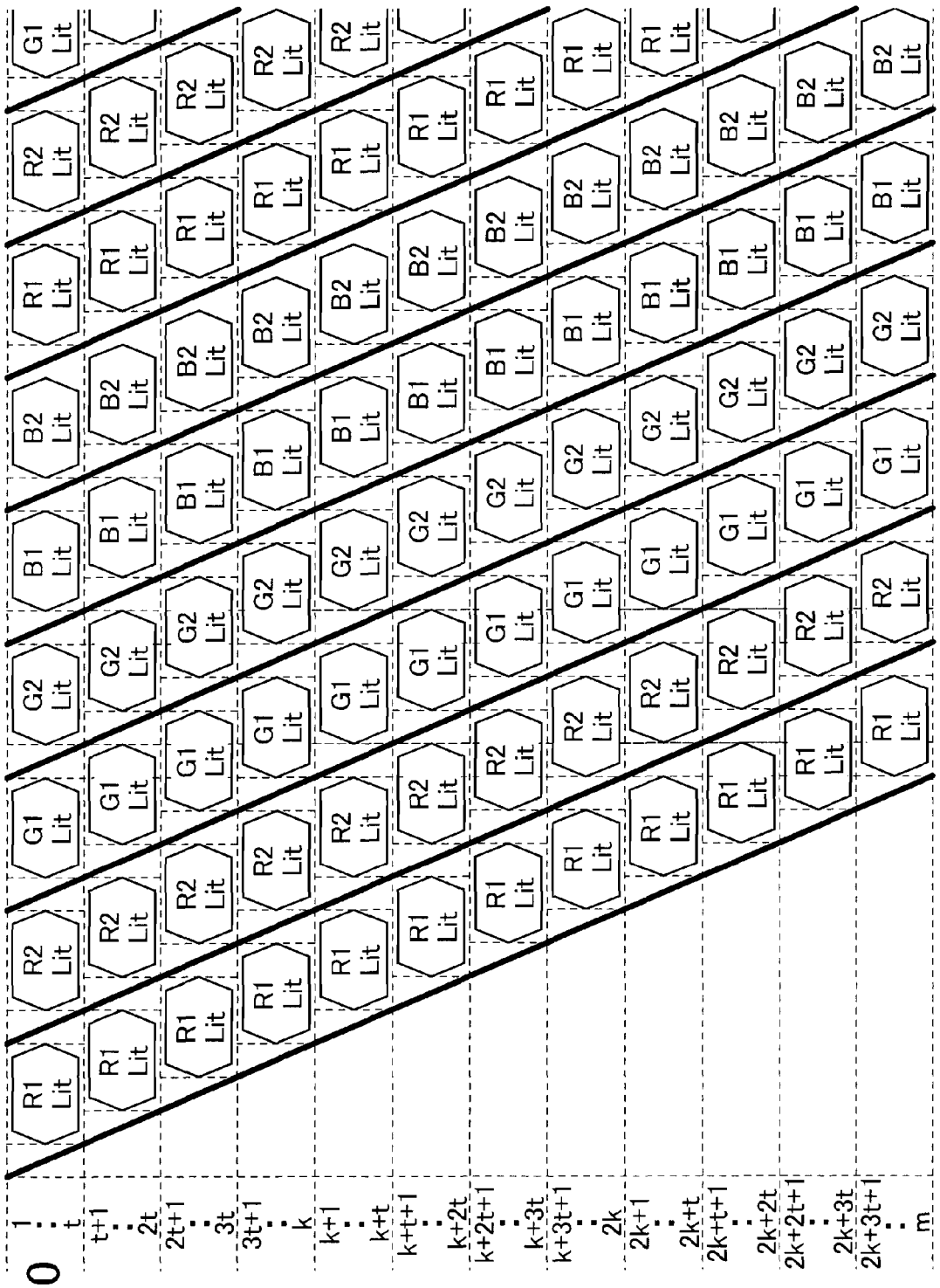
FIG. 10 illustrates an operation example of a liquid crystal display device.

Unlike FIG. 6 in which light irradiation is sequentially performed from R1, G1, B1, R2, G2, and B2 in the light sources, FIG. 10 illustrates a comparison example in which light irradiation is sequentially performed from R1, R2, G1, G2, B1, and B2 in the light sources. In the example illustrated in FIG. 10, light irradiation is sequentially performed from R1, K, G1, K, B1, and K so that the first image visually identified with the left eye is displayed and light irradiation is sequentially performed from K, R2, K, G2, K, and B2 so that the second image visually identified with the right eye is displayed. In other words, in the example illustrated in FIG. 10 that is the comparison example of FIG. 6, black images are inserted between irradiation with R1 (R2) and irradiation with G1 (G2), irradiation with G1 (G2) and irradiation with B1 (B2), and irradiation with B1 (B2) and irradiation with R1 (R2) by the field-sequential method. Only data of any of the colors due to blinking or the like of the viewer is lost, and color breakup is easily observed.

From the above description, in the liquid crystal display device in this embodiment, the frequency of input of video signals based on a plurality of light sources can be increased, and black images can be inserted in an image display period in the field-sequential method without complex operation. Thus, display defects due to color breakup that is a display problem unique to the field-sequential method can be reduced.

Further, in the case where the backlight is lit as in the operation example illustrated in FIG. 6, adjacent backlight units do not emit light of different colors. In other words, in the case where the backlight is lit as in the operation example illustrated in FIG. 6, irradiation with light of different colors from the backlight units can be separately performed. Specifically, in the case where the backlight is lit after video signals are input to regions in the period T1, the adjacent backlight units do not emit light of different colors and irradiation with light of different colors from the backlight units can be separately performed.

For example, in the period T1, when the blue (B) light source is lit in the backlight unit for the (k+1)th to (k+t)th rows after video signals for controlling blue (B) light are input to the n pixels provided in the (k+1)th row to the n pixels provided in the (k+t)th row, the blue (B) light source is lit or lighting itself is not performed (neither the red (R) light source nor the green (G) light source is lit) in the backlight unit for the (3t+1)th to k-th rows and a backlight unit for the (k+t+1)th to (k+2t)th rows. Thus, the probability of transmission of light of a color that is different from a given color through a pixel to which image data of the given color is input can be reduced.

This embodiment or part of this embodiment can be combined with any of the other embodiments or part of any of the other embodiments.

Embodiment 2

In this embodiment, an example of a transistor that can be applied to a liquid crystal display device disclosed in this specification is described. There is no particular limitation on the structure of the transistor that can be applied to the liquid crystal display device disclosed in this specification. For example, a staggered transistor, a planar transistor, or the like with a top-gate structure in which a gate electrode is provided over an oxide semiconductor layer with a gate insulating layer provided therebetween or a bottom-gate structure in which a gate electrode is provided below an oxide semiconductor layer with a gate insulating layer provided therebetween can be used. Further, the transistor may have a single-gate structure including one channel formation region, a double-gate structure including two channel formation regions, or a triple-gate structure including three channel formation regions. Furthermore, the transistor may have a dual-gate structure including two gate electrode layers placed over and below a channel region with a gate insulating layer provided therebetween. Note that FIGS. 11A to 11D illustrate examples of cross-sectional structures of transistors.

Figure 11A:
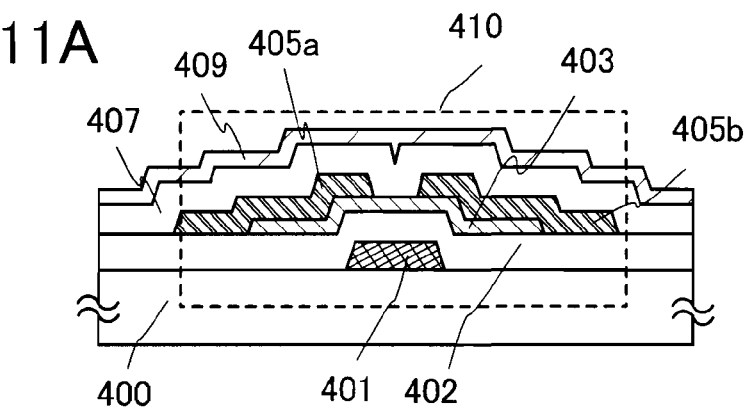
FIGS. 11A to 11D are cross-sectional views of transistors in one embodiment of the present invention.

A transistor 410 illustrated in FIG. 11A is a kind of bottom-gate transistor and is also referred to as an inverted-staggered transistor.

The transistor 410 includes, over a substrate 400 having an insulating surface, a gate electrode layer 401, a gate insulating layer 402, a semiconductor layer 403, a source electrode layer 405a, and a drain electrode layer 405b. In addition, an insulating film 407 which covers the transistor 410 and is stacked over the semiconductor layer 403 is provided. A protective insulating layer 409 is formed over the insulating film 407.

Figure 11B:
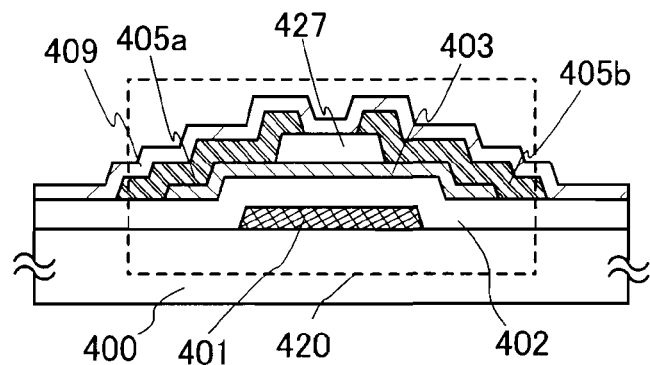

A transistor 420 illustrated in FIG. 11B is a kind of bottom-gate transistor referred to as a channel-protective transistor (also referred to as a channel-stop transistor) and is also referred to as an inverted-staggered transistor.

The transistor 420 includes, over the substrate 400 having an insulating surface, the gate electrode layer 401, the gate insulating layer 402, the semiconductor layer 403, an insulating layer 427 which functions as a channel protective layer for covering a channel formation region of the semiconductor layer 403, the source electrode layer 405a, and the drain electrode layer 405b. Further, the protective insulating layer 409 is formed so as to cover the transistor 420.

Figure 11C:
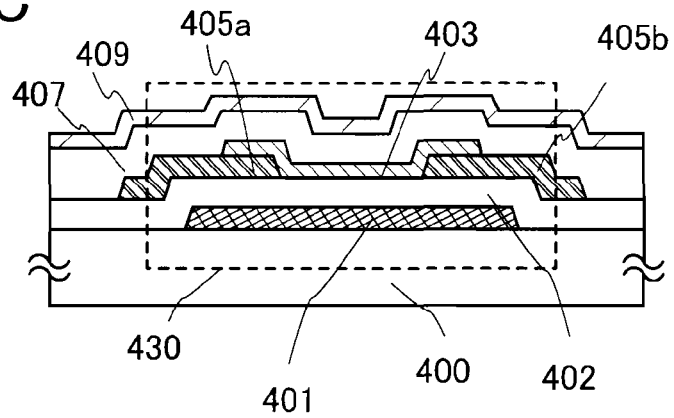

A transistor 430 illustrated in FIG. 11C is a bottom-gate transistor and includes, over the substrate 400 having an insulating surface, the gate electrode layer 401, the gate insulating layer 402, the source electrode layer 405a, the drain electrode layer 405b, and the oxide semiconductor layer 403. The insulating film 407 which covers the transistor 430 and is in contact with the semiconductor layer 403 is provided. The protective insulating layer 409 is formed over the insulating film 407.

In the transistor 430, the gate insulating layer 402 is provided over and in contact with the substrate 400 and the gate electrode layer 401, and the source electrode layer 405a and the drain electrode layer 405b are provided over and in contact with the gate insulating layer 402. Further, the semiconductor layer 403 is provided over the gate insulating layer 402, the source electrode layer 405a, and the drain electrode layer 405b.

Figure 11D:
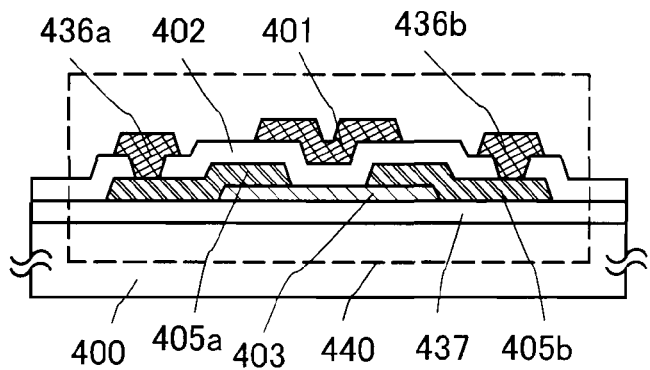

A transistor 440 illustrated in FIG. 11D is a kind of top-gate transistor. The transistor 440 includes, over the substrate 400 having an insulating surface, an insulating layer 437, the oxide semiconductor layer 403, the source electrode layer 405a, the drain electrode layer 405b, the gate insulating layer 402, and the gate electrode layer 401. A wiring layer 436a and a wiring layer 436b are formed in contact with and connected to the source electrode layer 405a and the drain electrode layer 405b, respectively.

As a semiconductor material used for the semiconductor layer 403, amorphous silicon, microcrystalline silicon, polysilicon, an oxide semiconductor, an organic semiconductor, or the like can be used.

Although there is no particular limitation on a substrate that can be used as the substrate 400 having an insulating surface, a glass substrate formed using barium borosilicate glass, aluminoborosilicate glass, or the like is used.

In the bottom-gate structure transistors 410, 420, and 430, an insulating film serving as a base film may be provided between the substrate and the gate electrode layer. The base film has a function of preventing diffusion of an impurity element from the substrate, and can be formed to have a single-layer structure or a layered structure of one or more of a silicon nitride film, a silicon oxide film, a silicon nitride oxide film, and a silicon oxynitride film.

The gate electrode layer 401 can be formed to have a single-layer structure or a layered structure of a metal material such as molybdenum, titanium, chromium, tantalum, tungsten, aluminum, copper, neodymium, or scandium, or an alloy material which contains any of these materials as its main component.

The gate insulating layer 402 can be formed to have a single-layer structure or a layered structure of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, or a hafnium oxide layer by plasma-enhanced CVD, sputtering, or the like. For example, a gate insulating layer is formed in such a manner that a silicon nitride layer ($SiN_y$ (y>0)) with a thickness of 50 to 200 nm is formed as a first gate insulating layer by plasma-enhanced CVD and a silicon oxide layer ($SiO_x$ (x>0)) with a thickness of 5 to 300 nm is formed as a second gate insulating layer over the first gate insulating layer. For example, the thickness of the gate insulating film is about 200 nm.

As a conductive film used for the source electrode layer 405a and the drain electrode layer 405b, for example, a metal film containing an element selected from Al, Cr, Cu, Ta, Ti, Mo, or W, or a metal nitride film containing any of these elements as its component (e.g., a titanium nitride film, a molybdenum nitride film, or a tungsten nitride film) can be used. A high-melting-point metal film of Ti, Mo, W, or the like or a metal nitride film of any of these elements (e.g., a titanium nitride film, a molybdenum nitride film, or a tungsten nitride film) may be stacked on either one or both a lower side and an upper side of a metal film of Al, Cu, or the like.

A material which is similar to the material of the source electrode layer 405a and the drain electrode layer 405b can be used for a conductive film used for the wiring layer 436a and the wiring layer 436b which are connected to the source electrode layer 405a and the drain electrode layer 405b, respectively.

Alternatively, the conductive film to be the source electrode layer 405a and the drain electrode layer 405b (including a wiring layer formed using the same layer as source electrode layer 405a and the drain electrode layer 405b) may be formed using a conductive metal oxide. As the conductive metal oxide, indium oxide ($In_2O_3$), tin oxide ($SnO_2$), zinc oxide (ZnO), indium oxide-tin oxide alloy ($In_2O_3$—$SnO_2$; abbreviated to ITO), indium oxide-zinc oxide alloy ($In_2O_3$—ZnO), or any of these metal oxide materials in which silicon oxide is contained can be used.

As the insulating films 407 and 427 provided over the semiconductor layer, and the insulating layer 437 provided below the semiconductor layer, an inorganic insulating film such as a silicon oxide film, a silicon oxynitride film, an aluminum oxide film, an aluminum oxynitride film, or the like can be typically used.

For the protective insulating layer 409 provided over the semiconductor layer, an inorganic insulating film such as a silicon nitride film, an aluminum nitride film, a silicon nitride oxide film, or an aluminum nitride oxide film can be used.

Further, a planarization insulating film may be formed over the protective insulating layer 409 so that surface roughness due to the transistor is reduced. For the planarization insulating film, an organic material such as polyimide, acrylic, or benzocyclobutene can be used. Other than such organic materials, a low-dielectric constant material (a low-k material) or the like can be used. Note that the planarization insulating film may be formed by a stack of a plurality of insulating films formed using these materials.

This embodiment can be combined with any of the structures described in the other embodiments as appropriate.

Embodiment 3

A liquid crystal display device disclosed in this specification can be used in a variety of electronic devices (including game machines). Examples of electronic devices are a television set (also referred to as a television or a television receiver), a monitor of a computer or the like, a camera such as a digital camera or a digital video camera, a digital photo frame, a cellular phone handset (also referred to as a cellular phone or a cellular phone device), a portable game machine, a personal digital assistant, an audio reproducing device, a large game machine such as a pinball machine, and the like.

Examples of electronic devices each including the display device described in any of the above embodiments are described.

Figure 12A:
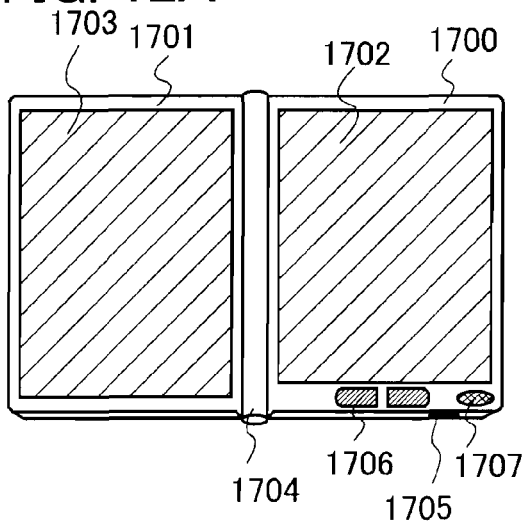
FIGS. 12A to 12D illustrate electronic devices.

FIG. 12A illustrates an example of an e-book reader. The e-book reader illustrated in FIG. 12A includes two housings 1700 and 1701. The housings 1700 and 1701 are combined with each other with a hinge 1704 so that the e-book reader can be opened and closed. With such a structure, the e-book reader can operate like a paper book.

A display portion 1702 and a display portion 1703 are incorporated in the housing 1700 and the housing 1701, respectively. The display portion 1702 and the display portion 1703 may display one image or different images. In the case where the display portion 1702 and the display portion 1703 display different images, for example, a display portion on the right side (the display portion 1702 in FIG. 12A) can display text and a display portion on the left side (the display portion 1703 in FIG. 12A) can display images.

FIG. 12A illustrates an example in which the housing 1700 includes an operation portion and the like. For example, the housing 1700 includes a power input terminal 1705, operation keys 1706, a speaker 1707, and the like. With the operation key 1706, pages can be turned. Note that a keyboard, a pointing device, or the like may be provided on the same surface as the display portion of the housing. Further, an external connection terminal (e.g., an earphone terminal, a USB terminal, or a terminal that can be connected to a variety of cables such as USB cables), a recording medium insertion portion, or the like may be provided on a back surface or a side surface of the housing. Further, the e-book reader illustrated in FIG. 12A may function as an electronic dictionary.

Figure 12B:
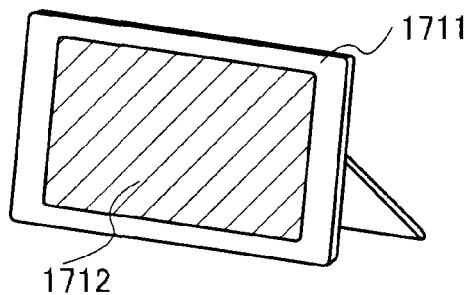

FIG. 12B illustrates an example of a digital photo frame including a display device. For example, in the digital photo frame illustrated in FIG. 12B, a display portion 1712 is incorporated in a housing 1711. The display portion 1712 can display a variety of images. For example, the display portion 1712 can display data of images taken with a digital camera or the like, so that the digital photo frame can function as a normal photo frame.

Note that the digital photo frame illustrated in FIG. 12B includes an operation portion, an external connection terminal (e.g., a USB terminal or a terminal that can be connected to a variety of cables such as USB cables), a recording medium insertion portion, and the like. Although these components may be provided on the same surface as the display portion, it is preferable to provide them on a side surface or a back surface for the design of the digital photo frame. For example, a memory for storing data of images taken with a digital camera is inserted in the recording medium insertion portion of the digital photo frame, so that the image data can be transferred and then displayed on the display portion 1712.

Figure 12C:
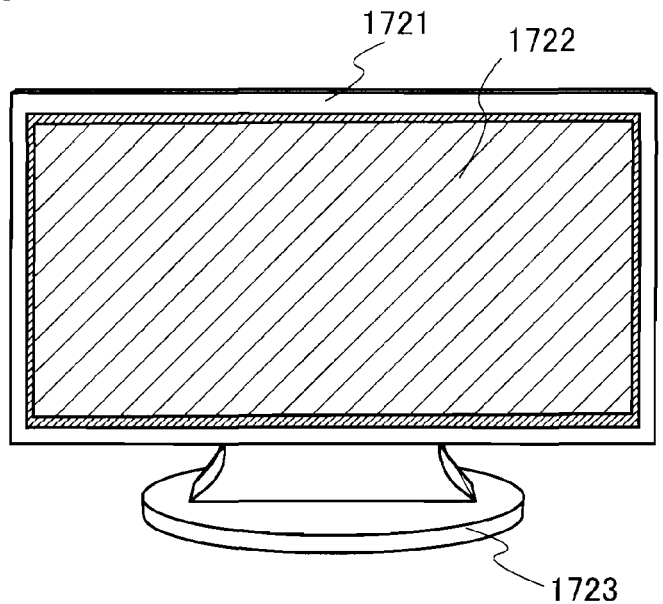

FIG. 12C illustrates an example of a television set including a display device. In the television set illustrated in FIG. 12C, a display portion 1722 is incorporated in a housing 1721. The display portion 1722 can display images. Further, the housing 1721 is supported by a stand 1723 here. The display device described in any of the above embodiments can be used in the display portion 1722.

The television set illustrated in FIG. 12C can be operated by an operation switch of the housing 1721 or a separate remote control. Channels and volume can be controlled with operation keys of the remote control, so that images displayed on the display portion 1722 can be controlled. Further, the remote control may include a display portion for displaying data output from the remote control.

Figure 12D:
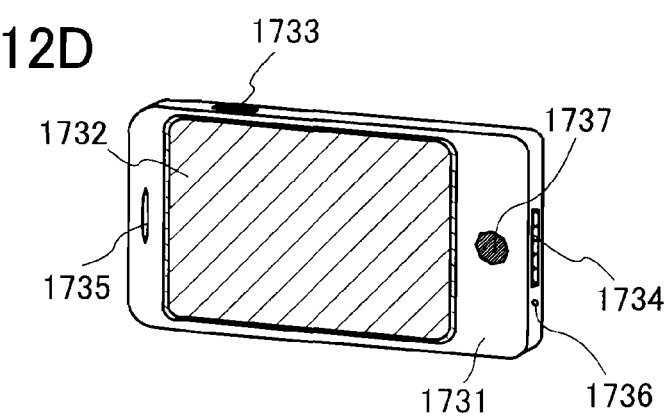

FIG. 12D illustrates an example of a cellular phone handset including a display device. The cellular phone handset illustrated in FIG. 12D includes a display portion 1732 incorporated in a housing 1731, operation buttons 1733 and 1737, an external connection port 1734, a speaker 1735, a microphone 1736, and the like.

The display portion 1732 of the cellular phone handset illustrated in FIG. 12D is a touch panel. When the display portion 1732 is touched with a finger or the like, contents displayed on the display portion 1732 can be controlled. Further, operations such as making calls and composing mails can be performed by touching the display portion 1732 with a finger or the like.

This embodiment can be combined with any of the structures described in the other embodiments as appropriate.

REFERENCE NUMERALS

10: pixel portion, 11: scan line driver circuit, 12: signal line driver circuit, 13: scan line, 14: signal line, 15: pixel, 16: transistor, 17: capacitor, 18: liquid crystal element, 20: pulse output circuit, 21: terminal, 22: terminal, 23: terminal, 24: terminal, 25: terminal, 26: terminal, 27: terminal, 31: transistor, 32: transistor, 33: transistor, 34: transistor, 35: transistor, 36: transistor, 37: transistor, 38: transistor, 39: transistor, 40: backlight unit, 101: region, 102: region, 103: region, 120: shift register, 121: transistor, 400: substrate, 401: gate electrode layer, 402: gate insulating layer, 403: semiconductor layer, 407: insulating film, 409: protective insulating layer, 410: transistor, 420: transistor, 427: insulating layer, 430: transistor, 437: insulating layer, 440: transistor, 702: eyeglass, 723: left eye, 724: right eye, 801: liquid crystal display device, 802: eyeglass, 810: visible light range, 811: wavelength band, 812: wavelength band, 813: wavelength band, 821: image, 822: image, 823: left eye, 824: right eye, 831: projector, 832: projector, 1700: housing, 1701: housing, 1702: display portion, 1703: display portion, 1704: hinge, 1705: power input terminal, 1706: operation key, 1707: speaker, 1711: housing, 1712: display portion, 1721: housing, 1722: display portion, 1723: stand, 1731: housing, 1732: display portion, 1733: operation button, 1734: external connection port, 1735: speaker, 1736: microphone, 1737: operation button, 405a: source electrode layer, 405b: drain electrode layer, 436a: wiring layer, 436b: wiring layer, 703A: spectral filter for left eye, 703B: spectral filter for right eye, 803A: spectral filter for left eye, and 803B: spectral filter for right eye.

This application is based on Japanese Patent Application serial no. 2010-167824 filed with Japan Patent Office on Jul. 27, 2010, the entire contents of which are hereby incorporated by reference.

The invention claimed is:

1. A method for driving a liquid crystal display device including a plurality of pixels arranged in m rows by n columns (m is a natural number of 12 or more and n is a natural number) comprising the steps of:

in a period during which a video signal used for controlling transmission of light of a first color is input to a plurality of pixels arranged in a first row to a k-th row (k is a natural number of less than or equal to (m/3)), a video signal used for controlling transmission of light of a second color is input to a plurality of pixels arranged in a (k+1)th row to a 2k-th row, and a video signal used for controlling transmission of light of a third color is input to a plurality of pixels arranged in a (2k+1)th row to an m-th row, inputting the video signal used for controlling transmission of the light of the first color to a plurality of pixels arranged in the first row to a t-th row (t is a natural number of (k/N) (N is a natural number)), inputting the video signal used for controlling transmission of the light of the second color to a plurality of pixels arranged in the (k+1)th row to a (k+t)th row, and inputting the video signal used for controlling transmission of the light of the third color to a plurality of pixels arranged in the (2k+1)th row to a (2k+t)th row;

irradiating the plurality of pixels arranged in the first row to the t-th row with the light of the first color, irradiating the plurality of pixels arranged in the (k+1)th row to the (k+t)th row with the light of the second color, and irradiating the plurality of pixels arranged in the (2k+1)th row to the (2k+t)th row with the light of the third color, the light of the first color, the light of the second color, and the light of the third color corresponding to light in a second red wavelength band, light in a first blue wavelength band, and light in a first green wavelength band in a first period;

irradiating the plurality of pixels arranged in the first row to the t-th row with the light of the first color, irradiating the plurality of pixels arranged in the (k+1)th row to the (k+t)th row with the light of the second color, and irradiating the plurality of pixels arranged in the (2k+1)th row to the (2k+t)th row with the light of the third color, the light of the first color, the light of the second color, and the light of the third color corresponding to light in a second green wavelength band, light in a second red wavelength band, and light in a first blue wavelength band in a second period subsequent to the first period, wherein the light of the first color, the light of the second color and the light of the third color are irradiated concurrently with each other, and wherein the light in the first blue wavelength band has a shorter wavelength than the light in the second blue wavelength, the light in the first green wavelength band has a shorter wavelength than the light in the second green wavelength, and the light in the first red wavelength band has a shorter wavelength than the light in the second red wavelength.

2. The method for driving a liquid crystal display device according to claim 1, wherein a stereoscopic image in the liquid crystal display device is visually identified using an eyeglass including a spectral filter for left eye for visually identifying a first image by a field-sequential method by transmission of light in the first red wavelength band, light in the first green wavelength band, and light in the first blue wavelength band and a spectral filter for right eye for visually identifying a second image by a field-sequential method by transmission of light in the second red wavelength band, light in the second green wavelength band, and light in the second blue wavelength band.

3. The method for driving a liquid crystal display device according to claim 2, wherein an image seen through the spectral filter for left eye is visually identified sequentially from a first image and a black image and an image seen through the spectral filter for right eye is visually identified sequentially from a black image and a second image.

4. The method for driving a liquid crystal display device according to claim 1, further comprising a step of separately performing an irradiation with the light in the first red wavelength band, an irradiation with the light in the first green wavelength band, an irradiation with the light in the first blue wavelength band, an irradiation with the light in the second red wavelength band, an irradiation with the light in the second green wavelength band, and an irradiation with the light in the second blue wavelength band.

5. The method for driving a liquid crystal display device according to claim 1, wherein the liquid crystal display device is incorporated in one of a monitor of a computer, a personal digital assistant, an e-book reader, a cellular phone, a digital camera, and a television set.

6. A method for driving a liquid crystal display device including a plurality of pixels arranged in m rows by n columns (m is a natural number of 12 or more and n is a natural number) comprising the steps of:

in a period during which a video signal used for controlling transmission of light of a first color is input to a plurality of pixels arranged in a first row to a k-th row (k is a natural number of less than or equal to (m/3)), a video signal used for controlling transmission of light of a second color is input to a plurality of pixels arranged in a (k+1)th row to a 2k-th row, and a video signal used for controlling transmission of light of a third color is input to a plurality of pixels arranged in a (2k+1)th row to an m-th row, inputting the video signal used for controlling transmission of the light of the first color to a plurality of pixels arranged in the first row to a t-th row (t is a natural number of (k/N) (N is a natural number)), inputting the video signal used for controlling transmission of the light of the second color to a plurality of pixels arranged in the (k+1)th row to a (k+t)th row, and inputting the video signal used for controlling transmission of the light of the third color to a plurality of pixels arranged in the (2k+1)th row to a (2k+t)th row;

irradiating the plurality of pixels arranged in the first row to the t-th row with the light of the first color, irradiating the plurality of pixels arranged in the (k+1)th row to the (k+t)th row with the light of the second color, and irradiating the plurality of pixels arranged in the (2k+1)th row to the (2k+t)th row with the light of the third color, the light of the first color, the light of the second color, and the light of the third color corresponding to light in a second red wavelength band, light in a first blue wavelength band, and light in a first green wavelength band in a first period;

irradiating the plurality of pixels arranged in the first row to the t-th row with the light of the first color, irradiating the plurality of pixels arranged in the (k+1)th row to the (k+t)th row with the light of the second color, and irradiating the plurality of pixels arranged in the (2k+1)th row to the (2k+t)th row with the light of the third color, the light of the first color, the light of the second color, and the light of the third color corresponding to light in a second green wavelength band, light in a second red wavelength band, and light in a second first blue wavelength band in a second period subsequent to the first period;

after inputting video signals to (1+nt)th to ((n+1)t)th rows, (k+(1+nt))th to (k+(n+1)t)th rows, and (2k+(1+nt))th to (2k+(n+1)t)th rows, performing an irradiation with the light of the first color, an irradiation with the light of the second color, and an irradiation with the light of the third color on pixels included in the (1+nt)th to ((n+1)t)th rows, pixels included in the (k+(1+nt))th to (k+(n+1)t)th rows, and pixels included in the (2k+(1+nt))th to (2k+(n+1)t)th rows, under the conditions of natural numbers of n=1 to n=((k/t)−1), wherein the light of the first color, the light of the second color and the light of the third color are irradiated concurrently with each other, and wherein the light in the first blue wavelength band has a shorter wavelength than the light in the second blue wavelength, the light in the first green wavelength band has a shorter wavelength than the light in the second green wavelength, and the light in the first red wavelength band has a shorter wavelength than the light in the second red wavelength.

7. The method for driving a liquid crystal display device according to claim 6, wherein a stereoscopic image in the liquid crystal display device is visually identified using an eyeglass including a spectral filter for left eye for visually identifying a first image by a field-sequential method by transmission of light in the first red wavelength band, light in the first green wavelength band, and light in the first blue wavelength band and a spectral filter for right eye for visually identifying a second image by a field-sequential method by transmission of light in the second red wavelength band, light in the second green wavelength band, and light in the second blue wavelength band.

8. The method for driving a liquid crystal display device according to claim 7, wherein an image seen through the spectral filter for left eye is visually identified sequentially from a first image and a black image and an image seen through the spectral filter for right eye is visually identified sequentially from a black image and a second image.

9. The method for driving a liquid crystal display device according to claim 6, further comprising a step of separately performing an irradiation with the light in the first red wavelength band, an irradiation with the light in the first green wavelength band, an irradiation with the light in the first blue wavelength band, an irradiation with the light in the second red wavelength band, an irradiation with the light in the second green wavelength band, and an irradiation with the light in the second blue wavelength band.

10. The method for driving a liquid crystal display device according to claim 6, wherein the liquid crystal display device is incorporated in one of a monitor of a computer, a personal digital assistant, an e-book reader, a cellular phone, a digital camera, and a television set.

* * * * *